US008987408B2

(12) United States Patent
Jernigan

(10) Patent No.: US 8,987,408 B2
(45) Date of Patent: Mar. 24, 2015

(54) HIGH INTRINSIC VISCOSITY MELT PHASE POLYESTER POLYMERS WITH ACCEPTABLE ACETALDEHYDE GENERATION RATES

(71) Applicant: Grupo Petrotemex, S.A. de C.V., San Pedro Garza Garcia, Nuevo Leon (MX)

(72) Inventor: Mary Therese Jernigan, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 0 days.

(21) Appl. No.: 14/038,832

(22) Filed: Sep. 27, 2013

(65) Prior Publication Data

US 2014/0021652 A1 Jan. 23, 2014

Related U.S. Application Data

(62) Division of application No. 11/154,208, filed on Jun. 16, 2005, now Pat. No. 8,557,950.

(51) Int. Cl.
*C08G 63/00* (2006.01)
*C08G 63/78* (2006.01)
*C08G 63/86* (2006.01)

(52) U.S. Cl.
CPC .............. *C08G 63/78* (2013.01); *C08G 63/866* (2013.01)
USPC ..... 528/286; 528/272; 528/308.1; 528/308.2; 528/308.3

(58) Field of Classification Search
CPC ........ C08G 3/16; C08G 63/183; C08G 63/78; C08G 63/866; C08L 67/02
USPC ........... 528/271, 272, 285, 286, 308.1, 308.2, 528/308.3
See application file for complete search history.

(56) References Cited

U.S. PATENT DOCUMENTS

| | | | |
|---|---|---|---|
| 2,720,506 A | 10/1955 | Caldwell et al. |
| 2,808,390 A | 10/1957 | Caldwell et al. |
| 2,965,613 A | 12/1960 | Milone et al. |
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,148,172 A | 9/1964 | Fox |
| 3,153,008 A | 10/1964 | Fox |
| 3,264,255 A | 8/1966 | Taylor |
| 3,271,367 A | 9/1966 | Schnell et al. |
| 3,420,913 A | 1/1969 | Railsback |
| 3,451,971 A | 6/1969 | Lazarus |
| 3,497,477 A | 2/1970 | Barkey et al. |
| 3,528,945 A | 9/1970 | Stewart et al. |
| 3,528,946 A | 9/1970 | Stewart et al. |
| 3,533,973 A | 10/1970 | Stewart et al. |
| 3,538,045 A | 11/1970 | Stewart et al. |
| 3,624,040 A | 11/1971 | Rath et al. |
| 3,631,153 A | 12/1971 | Carter et al. |
| 3,660,328 A | 5/1972 | Lindquist, Jr. |
| 3,673,139 A | 6/1972 | Hrach |
| 3,693,960 A | 9/1972 | Golde et al. |
| 3,733,309 A | 5/1973 | Wyeth et al. |
| 3,794,592 A | 2/1974 | Winters et al. |
| 3,795,601 A | 3/1974 | Brewer et al. |
| 3,796,691 A | 3/1974 | Chimura et al. |
| 3,852,262 A | 12/1974 | Vit et al. |

(Continued)

FOREIGN PATENT DOCUMENTS

| | | |
|---|---|---|
| AT | 259232 | 4/1965 |
| AT | 259232 | 1/1968 |

(Continued)

OTHER PUBLICATIONS

European Office Action issued Sep. 13, 2011 in connection with corresponding European Application No. 06 773 181.0, filed Jun. 14, 2006.

(Continued)

*Primary Examiner* — Frances Tischler
(74) *Attorney, Agent, or Firm* — Oblon, McClelland, Maier & Neustadt, L.L.P.

(57) ABSTRACT

A method for the production of solid polyester polymer particles comprising:

a) polycondensing a molten polyester polymer composition in the presence of a polycondensation catalyst composition comprising antimony species;

b) continuing the polycondenzation of the molten polyester polymer composition to an It.V. of 0.68 dL/g or more; and c) after reaching an It.V. of 0.68 dL/g or more, adding a catalyst stabilizer or deactivator to the polymer melt; and d) after reaching an It.V. of 0.68 dL/g or more, solidifying the melt into solid polyester polymer particles which do not contain organic acetaldehyde scavengers.

In a further embodiment, after solidification of the polyester from the melt phase polycondenzation process:

e) the amount of residual acetaldehyde in the particles in the solid state is reduced to a level of 10 ppm or less without increasing the It.V. of the particles by more than 0.03 dL/g.

Such particles having an AA (acetaldehyde) generation rate of 20 ppm or less upon being melted after solidification following the melt phase production and a free AA level reduced after melt phase production to 10 ppm or less are introduced into a melt processing zone to make articles such as bottle preforms having acceptable levels of residual AA.

18 Claims, No Drawings

(56) References Cited

U.S. PATENT DOCUMENTS

| | | |
|---|---|---|
| 3,867,315 A | 2/1975 | Tigner et al. |
| 3,867,349 A | 2/1975 | Heeg et al. |
| 3,869,304 A | 3/1975 | Bogulslawski et al. |
| 3,880,582 A | 4/1975 | Sawaya |
| 3,892,798 A | 7/1975 | Heeg et al. |
| 3,907,754 A | 9/1975 | Tershansy et al. |
| 3,917,604 A | 11/1975 | Hoyle |
| 3,951,905 A | 4/1976 | Sano et al. |
| 3,962,189 A | 6/1976 | Russin et al. |
| 4,010,145 A | 3/1977 | Russin et al. |
| 4,025,492 A | 5/1977 | Binsack et al. |
| 4,087,482 A | 5/1978 | Shaffer |
| 4,093,593 A | 6/1978 | Go |
| 4,097,445 A | 6/1978 | Martins et al. |
| 4,100,142 A | 7/1978 | Schaefer et al. |
| 4,107,149 A | 8/1978 | Bier et al. |
| 4,123,436 A | 10/1978 | Holub et al. |
| 4,124,566 A | 11/1978 | Saiki et al. |
| 4,136,089 A | 1/1979 | Bier et al. |
| 4,150,215 A | 4/1979 | Kelley |
| 4,159,301 A | 6/1979 | Buser et al. |
| 4,161,571 A | 7/1979 | Yasui et al. |
| 4,169,006 A | 9/1979 | Matsubara et al. |
| 4,176,224 A | 11/1979 | Bier et al. |
| 4,185,043 A | 1/1980 | Shaffer |
| 4,208,527 A | 6/1980 | Horlbeck et al. |
| 4,228,549 A | 10/1980 | Rispoli |
| 4,230,595 A | 10/1980 | Yamaji et al. |
| 4,238,593 A | 12/1980 | Duh |
| 4,250,078 A | 2/1981 | McFarlane et al. |
| 4,260,735 A | 4/1981 | Bander et al. |
| 4,289,871 A | 9/1981 | Rowan et al. |
| 4,321,298 A | 3/1982 | Shaffer et al. |
| 4,330,661 A | 5/1982 | Go |
| 4,340,721 A | 7/1982 | Bonnebat et al. |
| 4,343,922 A | 8/1982 | Shaffer |
| 4,356,299 A | 10/1982 | Cholod et al. |
| 4,357,461 A | 11/1982 | Go et al. |
| 4,359,570 A | 11/1982 | Davis et al. |
| 4,359,580 A | 11/1982 | Grasso |
| 4,360,564 A | 11/1982 | Philipp |
| 4,401,804 A | 8/1983 | Wooten et al. |
| 4,408,004 A | 10/1983 | Pengilly |
| 4,420,581 A | 12/1983 | McFarlane et al. |
| 4,424,337 A | 1/1984 | Smith et al. |
| 4,433,135 A | 2/1984 | Worley et al. |
| 4,434,276 A | 2/1984 | Horlbeck et al. |
| 4,440,924 A | 4/1984 | Kuze et al. |
| 4,447,595 A | 5/1984 | Smith et al. |
| 4,476,272 A | 10/1984 | Pengilly |
| 4,481,314 A | 11/1984 | Rule |
| 4,499,268 A | 2/1985 | Lohse et al. |
| 4,501,878 A | 2/1985 | Adams |
| 4,520,078 A | 5/1985 | Rabinowitz et al. |
| 4,532,290 A | 7/1985 | Jaquiss et al. |
| 4,535,118 A | 8/1985 | Pengilly |
| 4,545,926 A | 10/1985 | Fouts, Jr. et al. |
| 4,551,368 A | 11/1985 | Smith et al. |
| 4,604,303 A | 8/1986 | Takakura et al. |
| 4,609,721 A | 9/1986 | Kirshenbaum et al. |
| 4,613,664 A | 9/1986 | Tate et al. |
| 4,617,373 A | 10/1986 | Pruett et al. |
| 4,617,374 A | 10/1986 | Pruett et al. |
| 4,619,987 A | 10/1986 | Saiki et al. |
| 4,647,650 A | 3/1987 | Sasaki et al. |
| 4,654,399 A | 3/1987 | Callander et al. |
| 4,686,274 A | 8/1987 | Harris et al. |
| 4,702,963 A | 10/1987 | Phillips et al. |
| 4,702,980 A | 10/1987 | Matsuura et al. |
| 4,704,417 A | 11/1987 | Bonin et al. |
| 4,705,844 A | 11/1987 | Espenschied et al. |
| 4,740,377 A | 4/1988 | Dawes et al. |
| 4,745,173 A | 5/1988 | Weaver et al. |
| 4,745,174 A | 5/1988 | Pruett et al. |
| 4,764,323 A | 8/1988 | Al Ghatta |
| 4,775,598 A | 10/1988 | Jaeckel |
| 4,790,581 A | 12/1988 | Boswell et al. |
| 4,806,696 A | 2/1989 | Job |
| 4,831,115 A | 5/1989 | Golba, Jr. et al. |
| 4,837,115 A | 6/1989 | Igarashi et al. |
| 4,845,186 A | 7/1989 | Chujo et al. |
| 4,851,497 A | 7/1989 | Wakui et al. |
| 4,871,790 A | 10/1989 | Lamanna et al. |
| 4,876,230 A | 10/1989 | Job |
| 4,906,693 A | 3/1990 | Craun et al. |
| 4,982,014 A | 1/1991 | Freitag et al. |
| 4,999,418 A | 3/1991 | Krutak et al. |
| 5,008,230 A | 4/1991 | Nichols |
| 5,010,162 A | 4/1991 | Serini et al. |
| 5,041,405 A | 8/1991 | Lunsford et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,106,942 A | 4/1992 | Krutak et al. |
| 5,114,570 A | 5/1992 | Nelson et al. |
| 5,124,301 A | 6/1992 | Wyness et al. |
| 5,147,722 A | 9/1992 | Koslow |
| 5,189,077 A | 2/1993 | Kerby |
| 5,220,140 A | 6/1993 | Ball et al. |
| 5,235,027 A | 8/1993 | Thiele et al. |
| 5,250,333 A | 10/1993 | McNeely et al. |
| 5,252,699 A | 10/1993 | Chamberlin et al. |
| 5,254,288 A | 10/1993 | Verheijen et al. |
| 5,254,625 A | 10/1993 | Weaver et al. |
| 5,258,233 A | 11/1993 | Mills et al. |
| 5,266,413 A | 11/1993 | Mills et al. |
| 5,292,865 A | 3/1994 | Kerpes et al. |
| 5,296,587 A | 3/1994 | Sumner, Jr. et al. |
| 5,300,746 A | 4/1994 | Walters et al. |
| 5,310,977 A | 5/1994 | Stenkamp et al. |
| 5,317,066 A | 5/1994 | Watanabe |
| 5,318,797 A | 6/1994 | Matijevic et al. |
| 5,322,883 A | 6/1994 | Adyha et al. |
| 5,331,066 A | 7/1994 | Takanoo et al. |
| 5,340,884 A | 8/1994 | Mills et al. |
| 5,340,906 A | 8/1994 | Shirokura et al. |
| 5,340,910 A | 8/1994 | Chamberlin et al. |
| 5,367,070 A | 11/1994 | Nath et al. |
| 5,372,864 A | 12/1994 | Weaver et al. |
| 5,376,702 A | 12/1994 | Stibal et al. |
| 5,382,157 A | 1/1995 | Denis et al. |
| 5,384,337 A | 1/1995 | Budinger |
| 5,384,377 A | 1/1995 | Weaver et al. |
| 5,393,871 A | 2/1995 | Yau et al. |
| 5,403,807 A | 4/1995 | Narula |
| 5,409,983 A | 4/1995 | Jones et al. |
| 5,410,984 A | 5/1995 | Pikus et al. |
| 5,419,936 A | 5/1995 | Tindale |
| 5,466,803 A | 11/1995 | Borzatta et al. |
| 5,496,887 A | 3/1996 | Braune |
| 5,514,462 A | 5/1996 | Endo et al. |
| 5,519,112 A | 5/1996 | Harazoe et al. |
| 5,529,744 A | 6/1996 | Tindale |
| 5,532,332 A | 7/1996 | Weaver et al. |
| 5,539,078 A | 7/1996 | Burkett et al. |
| 5,541,244 A | 7/1996 | van der Meer et al. |
| 5,552,463 A | 9/1996 | Akkapeddi et al. |
| 5,567,796 A | 10/1996 | Nakatsukasa et al. |
| 5,573,820 A | 11/1996 | Harazoe et al. |
| 5,589,530 A | 12/1996 | Walsh |
| 5,593,740 A | 1/1997 | Strumban et al. |
| 5,608,027 A | 3/1997 | Crosby et al. |
| 5,610,231 A | 3/1997 | Braune |
| 5,646,208 A | 7/1997 | Cattron et al. |
| 5,648,032 A * | 7/1997 | Nelson et al. ................ 264/101 |
| 5,650,481 A | 7/1997 | Yau et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,718,860 A | 2/1998 | Lee et al. |
| 5,733,969 A | 3/1998 | Thiele |
| 5,742,223 A | 4/1998 | Simendinger, III et al. |
| 5,774,571 A | 6/1998 | Marshall |

(56) References Cited

U.S. PATENT DOCUMENTS

| | | |
|---|---|---|
| 5,780,575 A | 7/1998 | Brink et al. |
| 5,830,544 A | 11/1998 | Kerscher et al. |
| 5,830,981 A | 11/1998 | Koreishe et al. |
| 5,837,786 A | 11/1998 | Miyoshi et al. |
| 5,851,668 A | 12/1998 | Sandor et al. |
| 5,874,515 A | 2/1999 | Huang et al. |
| 5,886,133 A | 3/1999 | Hilbert et al. |
| 5,898,058 A | 4/1999 | Nichols et al. |
| 5,898,789 A | 4/1999 | Nichols et al. |
| 5,906,882 A | 5/1999 | Valente et al. |
| 5,925,710 A | 7/1999 | Wu et al. |
| 5,940,022 A | 8/1999 | Takatsu |
| 5,945,460 A | 8/1999 | Ekart et al. |
| 5,945,480 A | 8/1999 | Ekart et al. |
| 5,962,608 A | 10/1999 | Ryang et al. |
| 5,962,625 A | 10/1999 | Yau |
| 5,976,450 A | 11/1999 | Mreijen |
| 5,984,997 A | 11/1999 | Bickmore et al. |
| 5,998,004 A | 12/1999 | Nishino et al. |
| 6,020,419 A | 2/2000 | Bock et al. |
| 6,020,421 A | 2/2000 | Fukushima et al. |
| 6,022,920 A | 2/2000 | Maxwell et al. |
| 6,031,128 A | 2/2000 | Roh et al. |
| 6,034,167 A | 3/2000 | Tung et al. |
| 6,034,202 A | 3/2000 | Aharoni et al. |
| 6,036,905 A | 3/2000 | Park et al. |
| 6,042,773 A | 3/2000 | Teramoto et al. |
| 6,048,957 A | 4/2000 | Ekart et al. |
| 6,063,827 A | 5/2000 | Sacripante et al. |
| 6,066,714 A | 5/2000 | Putzig et al. |
| 6,099,778 A | 8/2000 | Nelson et al. |
| 6,113,997 A | 9/2000 | Massey et al. |
| 6,150,454 A | 11/2000 | Wu et al. |
| 6,156,867 A | 12/2000 | Aoyama et al. |
| 6,160,085 A | 12/2000 | Fujimori et al. |
| 6,165,601 A | 12/2000 | Noda et al. |
| 6,166,170 A | 12/2000 | Putzig |
| 6,197,223 B1 | 3/2001 | Weaver et al. |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,258,313 B1 | 7/2001 | Gottlieb |
| 6,261,656 B1 | 7/2001 | Semersky |
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,346,070 B1 | 2/2002 | Ohmatsuzawa et al. |
| 6,358,578 B1 | 3/2002 | Otto et al. |
| 6,365,659 B1 | 4/2002 | Aoyama et al. |
| 6,384,180 B1 | 5/2002 | Jernigan et al. |
| 6,417,320 B1 | 7/2002 | Otto et al. |
| 6,427,826 B1 | 8/2002 | Li et al. |
| 6,428,882 B1 | 8/2002 | Peiffer et al. |
| 6,440,383 B1 | 8/2002 | Duyvesteyn |
| 6,441,129 B2 | 8/2002 | Duh et al. |
| 6,451,220 B1 | 9/2002 | Ziolo et al. |
| 6,451,959 B1 | 9/2002 | Ohmatsuzawa et al. |
| 6,458,915 B1 | 10/2002 | Quillen |
| 6,465,098 B2 | 10/2002 | Mizuguchi et al. |
| 6,472,471 B2 | 10/2002 | Cooke et al. |
| 6,472,500 B2 | 10/2002 | Dhawan et al. |
| 6,473,024 B2 | 10/2002 | Toyoda et al. |
| 6,489,434 B2 | 12/2002 | Jen |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 | 1/2003 | Wu et al. |
| 6,541,598 B2 | 4/2003 | Duan et al. |
| 6,548,570 B1 | 4/2003 | Lange |
| 6,559,271 B2 | 5/2003 | Schaaf et al. |
| 6,569,479 B2 | 5/2003 | Rule |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,044 B2 | 7/2003 | Suzuki et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 6,602,568 B2 | 8/2003 | Semersky |
| 6,638,456 B2 | 10/2003 | Klein et al. |
| 6,649,731 B2 | 11/2003 | Hori et al. |
| 6,660,792 B2 | 12/2003 | Massey et al. |
| 6,664,413 B1 | 12/2003 | Cockrem |
| 6,710,158 B2 | 3/2004 | Edwards et al. |
| 6,716,904 B2 | 4/2004 | Takahashi |
| 6,727,306 B2 | 4/2004 | Edwards et al. |
| 6,727,372 B2 | 4/2004 | Cyr et al. |
| 6,733,873 B2 | 5/2004 | Mizutani et al. |
| 6,773,800 B2 | 8/2004 | Hosoe et al. |
| 6,774,204 B1 | 8/2004 | Putzig |
| 6,777,048 B2 | 8/2004 | Quillen |
| 6,780,916 B2 | 8/2004 | Tung et al. |
| 6,787,630 B1 | 9/2004 | Dominguez De Walter et al. |
| 6,794,463 B2 | 9/2004 | Aramaki et al. |
| 6,797,401 B2 | 9/2004 | Herron |
| 6,803,082 B2 | 10/2004 | Nichols et al. |
| 6,827,897 B2 | 12/2004 | Hall et al. |
| 6,828,272 B2 | 12/2004 | Wiegner et al. |
| 6,852,388 B2 | 2/2005 | Murschall et al. |
| 6,887,947 B1 | 5/2005 | Schaefer et al. |
| 6,896,830 B2 | 5/2005 | Carlton et al. |
| 6,896,966 B2 | 5/2005 | Crawford et al. |
| 6,908,956 B2 | 6/2005 | Sutoris et al. |
| 6,916,354 B2 | 7/2005 | Elliott |
| 6,933,055 B2 | 8/2005 | Share et al. |
| 6,953,768 B2 | 10/2005 | Wallace et al. |
| 7,041,716 B2 | 5/2006 | Ton-That et al. |
| 7,048,995 B2 | 5/2006 | Fujimori et al. |
| 7,063,377 B2 | 6/2006 | Brei et al. |
| 7,097,686 B2 | 8/2006 | Chandler et al. |
| 7,129,317 B2 | 10/2006 | Moore et al. |
| 7,138,478 B2 | 11/2006 | Kohlgruber et al. |
| 7,300,967 B2 | 11/2007 | Xia |
| 7,303,795 B2 | 12/2007 | Neal et al. |
| 7,368,523 B2 | 5/2008 | Xia et al. |
| 7,439,294 B2 | 10/2008 | Xia |
| 7,655,746 B2 | 2/2010 | Jernigan |
| 2002/0011694 A1 | 1/2002 | Nichols et al. |
| 2002/0014718 A1 | 2/2002 | Klein et al. |
| 2002/0032300 A1 | 3/2002 | Dowling et al. |
| 2002/0033560 A1 | 3/2002 | Nichols et al. |
| 2002/0077443 A1 | 6/2002 | Nichols et al. |
| 2002/0087027 A1 | 7/2002 | Lindall et al. |
| 2002/0091226 A1 | 7/2002 | Nichols et al. |
| 2002/0094402 A1 | 7/2002 | Jen |
| 2002/0128427 A1 | 9/2002 | Schaaf et al. |
| 2002/0136808 A1 | 9/2002 | Rule |
| 2002/0137872 A1 | 9/2002 | Schneider et al. |
| 2002/0137879 A1 | 9/2002 | Ohmatsuzawa et al. |
| 2002/0156229 A1 | 10/2002 | Silva et al. |
| 2002/0193555 A1 | 12/2002 | Hori et al. |
| 2002/0198297 A1 | 12/2002 | Odorisio et al. |
| 2003/0017336 A1 | 1/2003 | Gedanken et al. |
| 2003/0018115 A1 | 1/2003 | Massey et al. |
| 2003/0018160 A1 | 1/2003 | Otto et al. |
| 2003/0040564 A1 | 2/2003 | Tung et al. |
| 2003/0045673 A1 | 3/2003 | Nakajima et al. |
| 2003/0054160 A1 | 3/2003 | Fisher et al. |
| 2003/0057201 A1 | 3/2003 | Johnson, Jr. |
| 2003/0083191 A1 | 5/2003 | Nakajima et al. |
| 2003/0108702 A1 | 6/2003 | Tung et al. |
| 2003/0144459 A1 | 7/2003 | Fujimori et al. |
| 2003/0216253 A1 | 11/2003 | Wiegner et al. |
| 2004/0023000 A1 | 2/2004 | Young et al. |
| 2004/0030029 A1 | 2/2004 | Weinhold et al. |
| 2004/0058805 A1 | 3/2004 | Nakajima et al. |
| 2004/0077486 A1 | 4/2004 | Bellamy et al. |
| 2004/0086733 A1 | 5/2004 | Fujimori et al. |
| 2004/0096609 A1 | 5/2004 | Nichols et al. |
| 2004/0101642 A1 | 5/2004 | Quillen et al. |

(56) References Cited

U.S. PATENT DOCUMENTS

| | | |
|---|---|---|
| 2004/0102316 A1 | 5/2004 | Wallace et al. |
| 2004/0106767 A1 | 6/2004 | Simon et al. |
| 2004/0122150 A1 | 6/2004 | Quillen et al. |
| 2004/0127653 A1 | 7/2004 | Ellington et al. |
| 2004/0138057 A1 | 7/2004 | Wenzel |
| 2004/0151856 A1 | 8/2004 | Wood et al. |
| 2004/0178386 A1 | 9/2004 | Tung et al. |
| 2004/0180159 A1 | 9/2004 | Neal et al. |
| 2004/0180996 A1 | 9/2004 | Pearson et al. |
| 2004/0180997 A1 | 9/2004 | Pearson et al. |
| 2004/0185198 A1 | 9/2004 | Sisson et al. |
| 2004/0192813 A1 | 9/2004 | Pearson et al. |
| 2004/0224842 A1 | 11/2004 | Wallace et al. |
| 2004/0225103 A1 | 11/2004 | Kohlgrueber et al. |
| 2004/0225104 A1 | 11/2004 | Wiegner et al. |
| 2004/0230025 A1 | 11/2004 | DeBruin |
| 2004/0235640 A1 | 11/2004 | Sterzel |
| 2004/0236066 A1 | 11/2004 | Moore et al. |
| 2004/0241468 A1 | 12/2004 | Otaki |
| 2004/0249113 A1 | 12/2004 | Quillen et al. |
| 2005/0009941 A1 | 1/2005 | Sicken et al. |
| 2005/0058846 A1 | 3/2005 | Matsui et al. |
| 2005/0107576 A1 | 5/2005 | Hori et al. |
| 2005/0153086 A1 | 7/2005 | Moore et al. |
| 2005/0165148 A1 | 7/2005 | Bogerd et al. |
| 2005/0170115 A1 | 8/2005 | Tibbitt et al. |
| 2005/0180284 A1 | 8/2005 | Hay et al. |
| 2005/0187306 A1 | 8/2005 | Kulkarni |
| 2005/0203267 A1 | 9/2005 | Jernigan et al. |
| 2005/0222345 A1 | 10/2005 | Nakayama et al. |
| 2005/0239929 A1 | 10/2005 | Sakamoto et al. |
| 2005/0274454 A1 | 12/2005 | Extrand |
| 2006/0033078 A1 | 2/2006 | Rollick |
| 2006/0047103 A1 | 3/2006 | Armentrout et al. |
| 2006/0051542 A1 | 3/2006 | Xia et al. |
| 2006/0052504 A1 | 3/2006 | Xia et al. |
| 2006/0105129 A1 | 5/2006 | Xia et al. |
| 2006/0106146 A1 | 5/2006 | Xia et al. |
| 2006/0106192 A1 | 5/2006 | Xia et al. |
| 2006/0110557 A1 | 5/2006 | Xia et al. |
| 2006/0177614 A1 | 8/2006 | Xia |
| 2006/0205854 A1 | 9/2006 | Xia |
| 2006/0205855 A1 | 9/2006 | Xia |
| 2006/0222795 A1 | 10/2006 | Howell, Jr. et al. |
| 2006/0223958 A1 | 10/2006 | Fischbuch |
| 2006/0287472 A1 | 12/2006 | Jernigan |
| 2007/0059465 A1 | 3/2007 | Thompson et al. |
| 2007/0066714 A1 | 3/2007 | Xia et al. |
| 2007/0066735 A1 | 3/2007 | Quillen et al. |
| 2007/0066791 A1 | 3/2007 | Jernigan et al. |
| 2007/0066792 A1 | 3/2007 | Colhoun et al. |
| 2007/0106055 A1 | 5/2007 | Kageyama et al. |
| 2007/0203279 A1 | 8/2007 | Jarvis et al. |
| 2007/0260002 A1 | 11/2007 | Xia et al. |
| 2008/0058495 A1 | 3/2008 | Quillen et al. |
| 2008/0274320 A1* | 11/2008 | Yokoyama et al. ........ 428/36.92 |
| 2010/0028576 A1 | 2/2010 | Hayashi et al. |

FOREIGN PATENT DOCUMENTS

| | | |
|---|---|---|
| CN | 1312218 A | 9/2001 |
| CN | 1392174 | 1/2003 |
| CN | 1392174 A | 1/2003 |
| CN | 1482154 | 3/2004 |
| CN | 1482154 A | 3/2004 |
| DE | 1950553 | 4/1970 |
| DE | 1950553 A1 | 4/1970 |
| DE | 3248840 A1 | 9/1983 |
| DE | 19537930 A1 | 4/1997 |
| DE | 19841376 A1 | 3/2000 |
| EP | 1065230 | 11/1973 |
| EP | 0378154 A1 | 7/1990 |
| EP | 0429311 A2 | 5/1991 |
| EP | 0578464 | 1/1994 |
| EP | 0578464 A1 | 1/1994 |
| EP | 0581246 | 2/1994 |
| EP | 0634435 A1 | 1/1995 |
| EP | 0699700 | 3/1996 |
| EP | 699700 | 3/1996 |
| EP | 0541702 | 9/1996 |
| EP | 0465040 | 1/1997 |
| EP | 0884365 | 12/1998 |
| EP | 0921144 | 6/1999 |
| EP | 1065230 | 1/2001 |
| EP | 1152035 | 11/2001 |
| EP | 1188783 A2 | 3/2002 |
| EP | 1431337 A2 | 6/2004 |
| EP | 1477506 | 11/2004 |
| EP | 1227117 | 12/2004 |
| EP | 1516892 | 3/2005 |
| EP | 1535944 | 6/2005 |
| EP | 1548046 | 6/2005 |
| EP | 1239006 | 7/2005 |
| FR | 2675654 A1 | 10/1992 |
| GB | 673066 | 6/1952 |
| GB | 1060401 A | 3/1967 |
| GB | 1236888 A | 6/1971 |
| GB | 1242636 A | 8/1971 |
| GB | 1277264 A | 6/1972 |
| GB | 1285904 A | 8/1972 |
| GB | 1337751 | 11/1973 |
| GB | 1351176 A | 4/1974 |
| GB | 2112827 A | 7/1983 |
| JP | 46-35500 | 10/1971 |
| JP | 4635500 | 10/1971 |
| JP | 46-41025 | 12/1971 |
| JP | 46040711 | 12/1971 |
| JP | 46040713 | 12/1971 |
| JP | 46040714 | 12/1971 |
| JP | 46041025 | 12/1971 |
| JP | 46041031 | 12/1971 |
| JP | 46041033 | 12/1971 |
| JP | 47039497 | 11/1972 |
| JP | 47042989 | 12/1972 |
| JP | 48005798 | 1/1973 |
| JP | 48005798 A | 2/1973 |
| JP | 48007272 | 3/1973 |
| JP | 48026955 | 4/1973 |
| JP | 48026955 A | 4/1973 |
| JP | 73035948 | 4/1973 |
| JP | 47022989 | 8/1973 |
| JP | 48056782 | 8/1973 |
| JP | 48056783 | 8/1973 |
| JP | 48056784 | 8/1973 |
| JP | 47039496 | 9/1973 |
| JP | 48-79896 | 10/1973 |
| JP | 4879898 | 10/1973 |
| JP | 48031991 | 10/1973 |
| JP | 48079898 | 10/1973 |
| JP | 48079898 A | 10/1973 |
| JP | 73035948 B | 10/1973 |
| JP | 48038634 | 11/1973 |
| JP | 48038635 | 11/1973 |
| JP | 48038637 | 11/1973 |
| JP | 48044959 | 12/1973 |
| JP | 48099133 | 12/1973 |
| JP | 48102191 | 12/1973 |
| JP | 48102191 A | 12/1973 |
| JP | 49005918 | 1/1974 |
| JP | 49005918 A | 1/1974 |
| JP | 49010834 | 1/1974 |
| JP | 49010834 A | 1/1974 |
| JP | 49006835 | 2/1974 |
| JP | 49006839 | 2/1974 |
| JP | 49009116 | 3/1974 |
| JP | 48045015 | 4/1974 |
| JP | 49045014 | 4/1974 |
| JP | 49045014 A | 4/1974 |
| JP | 49032676 | 9/1974 |
| JP | 505735 | 3/1975 |
| JP | 5010196 | 4/1975 |
| JP | 50039711 | 4/1975 |
| JP | 50039711 A | 4/1975 |

(56) References Cited

FOREIGN PATENT DOCUMENTS

| | | |
|---|---|---|
| JP | 51042795 | 4/1976 |
| JP | 51127195 | 11/1976 |
| JP | 51127195 A | 11/1976 |
| JP | 51145594 | 12/1976 |
| JP | 51145594 A | 12/1976 |
| JP | 52-039790 | 3/1977 |
| JP | 52039790 | 3/1977 |
| JP | 52105591 A | 9/1977 |
| JP | 52123489 | 10/1977 |
| JP | 52123489 A | 10/1977 |
| JP | 52129798 | 10/1977 |
| JP | 52129798 A | 10/1977 |
| JP | 52129799 | 10/1977 |
| JP | 52129799 A | 10/1977 |
| JP | 53051294 | 5/1978 |
| JP | 53051294 A | 5/1978 |
| JP | 53051295 | 5/1978 |
| JP | 53051295 A | 5/1978 |
| JP | 53052595 | 5/1978 |
| JP | 53052595 A | 5/1978 |
| JP | 53105591 | 9/1978 |
| JP | 53105591 A | 9/1978 |
| JP | 54135896 | 10/1979 |
| JP | 54135896 A | 10/1979 |
| JP | 54163996 | 12/1979 |
| JP | 54163996 A | 12/1979 |
| JP | 55089332 | 7/1980 |
| JP | 55089332 A | 7/1980 |
| JP | 55115425 | 9/1980 |
| JP | 55149320 | 11/1980 |
| JP | 56008431 | 1/1981 |
| JP | 56-149423 | 11/1981 |
| JP | 56149423 | 11/1981 |
| JP | 56159248 A | 12/1981 |
| JP | 57038609 | 3/1982 |
| JP | 57038609 | 8/1982 |
| JP | 58109532 | 6/1983 |
| JP | 58109532 A | 6/1983 |
| JP | 59-015427 | 1/1984 |
| JP | 59015427 A | 1/1984 |
| JP | 59051295 A | 3/1984 |
| JP | 60-31526 | 2/1985 |
| JP | 60031526 | 2/1985 |
| JP | 60139750 | 7/1985 |
| JP | 60-151826 | 8/1985 |
| JP | 60151826 | 8/1985 |
| JP | 60202148 | 10/1985 |
| JP | 60219226 | 11/1985 |
| JP | 60291226 | 11/1985 |
| JP | 60264313 A | 12/1985 |
| JP | 61-278558 | 12/1986 |
| JP | 61-291650 | 12/1986 |
| JP | 61278558 A | 12/1986 |
| JP | 61291650 A | 12/1986 |
| JP | 62-039208 | 2/1987 |
| JP | 62039208 A | 2/1987 |
| JP | 62152715 | 7/1987 |
| JP | 62152715 A | 7/1987 |
| JP | 62161827 | 7/1987 |
| JP | 62161827 A | 7/1987 |
| JP | 62-177035 | 8/1987 |
| JP | 62177035 A | 8/1987 |
| JP | 62207337 | 9/1987 |
| JP | 62207337 A | 9/1987 |
| JP | 62297318 | 12/1987 |
| JP | 63237207 A | 10/1988 |
| JP | 63-264861 | 11/1988 |
| JP | 63264661 | 11/1988 |
| JP | 63-315604 | 12/1988 |
| JP | 63315604 A | 12/1988 |
| JP | 62-182065 | 1/1989 |
| JP | 62182065 | 1/1989 |
| JP | 2194030 | 7/1990 |
| JP | 22-14734 | 8/1990 |
| JP | 2214734 A | 8/1990 |
| JP | 3146707 | 6/1991 |
| JP | 3161509 | 7/1991 |
| JP | 3292323 | 12/1991 |
| JP | 4270727 | 9/1992 |
| JP | 4270727 A | 9/1992 |
| JP | 4370142 | 12/1992 |
| JP | 5097990 | 4/1993 |
| JP | 5-117379 | 5/1993 |
| JP | 5117379 | 5/1993 |
| JP | 5-287067 | 11/1993 |
| JP | 05097990 | 11/1993 |
| JP | 5287067 | 11/1993 |
| JP | 6087953 | 3/1994 |
| JP | 6100679 A | 4/1994 |
| JP | 06-184333 | 7/1994 |
| JP | 6184333 | 7/1994 |
| JP | 6215618 | 8/1994 |
| JP | 06215618 A | 8/1994 |
| JP | 6220173 A | 8/1994 |
| JP | 62-71949 | 9/1994 |
| JP | 6271494 | 9/1994 |
| JP | 19944271494 | 9/1994 |
| JP | 62-79599 | 10/1994 |
| JP | 6279599 | 10/1994 |
| JP | 6279599 A | 10/1994 |
| JP | 6286088 | 10/1994 |
| JP | 6286088 A | 10/1994 |
| JP | 6306154 | 11/1994 |
| JP | 1994306154 | 11/1994 |
| JP | 07058490 A | 3/1995 |
| JP | 7133412 | 5/1995 |
| JP | 7133412 A | 5/1995 |
| JP | 7224218 | 8/1995 |
| JP | 7224218 A | 8/1995 |
| JP | 72-68188 | 10/1995 |
| JP | 7268188 | 10/1995 |
| JP | 1995268188 | 10/1995 |
| JP | 7292087 | 11/1995 |
| JP | 07292087 A | 11/1995 |
| JP | 8003301 | 1/1996 |
| JP | 1996003301 | 1/1996 |
| JP | 1996073581 | 3/1996 |
| JP | 8283398 | 10/1996 |
| JP | 1996283398 | 10/1996 |
| JP | 8325364 | 12/1996 |
| JP | 9040850 | 2/1997 |
| JP | 1997040850 | 2/1997 |
| JP | 9176464 | 7/1997 |
| JP | 9176465 | 7/1997 |
| JP | 9183892 | 7/1997 |
| JP | 09-256220 | 9/1997 |
| JP | 9256220 | 9/1997 |
| JP | 9272793 | 10/1997 |
| JP | 9272793 A | 10/1997 |
| JP | 10316765 | 12/1998 |
| JP | 11005892 | 1/1999 |
| JP | 11071106 | 3/1999 |
| JP | 1999071106 | 3/1999 |
| JP | 11152324 | 6/1999 |
| JP | 1999152324 | 6/1999 |
| JP | 11-181067 | 7/1999 |
| JP | 11181067 | 7/1999 |
| JP | 11236440 | 8/1999 |
| JP | 1999236440 | 8/1999 |
| JP | 11349868 A | 12/1999 |
| JP | 2000128970 | 5/2000 |
| JP | 2000128971 | 5/2000 |
| JP | 2000129102 | 5/2000 |
| JP | 2000226446 | 8/2000 |
| JP | 2000302854 | 10/2000 |
| JP | 200126639 | 1/2001 |
| JP | 2001026639 | 1/2001 |
| JP | 2001039707 | 2/2001 |
| JP | 2001048972 A | 2/2001 |
| JP | 2001098418 A | 4/2001 |
| JP | 2001163964 | 6/2001 |
| JP | 2001225474 | 8/2001 |
| JP | 2001262016 | 9/2001 |
| JP | 2001278970 A | 10/2001 |

(56) References Cited

FOREIGN PATENT DOCUMENTS

| | | |
|---|---|---|
| JP | 2001354759 A | 12/2001 |
| JP | 2002249569 A | 9/2002 |
| JP | 2002249648 | 9/2002 |
| JP | 2002249653 | 9/2002 |
| JP | 2002322254 | 11/2002 |
| JP | 2002322258 | 11/2002 |
| JP | 2002332337 | 11/2002 |
| JP | 2003040992 | 2/2003 |
| JP | 2003113230 | 4/2003 |
| JP | 2003113232 | 4/2003 |
| JP | 2003171454 | 6/2003 |
| JP | 2003171455 | 6/2003 |
| JP | 2003-268628 | 9/2003 |
| JP | 2003268093 | 9/2003 |
| JP | 2003268628 | 9/2003 |
| JP | 2003301038 | 10/2003 |
| JP | 2003301090 | 10/2003 |
| JP | 2003301093 | 10/2003 |
| JP | 2003306536 | 10/2003 |
| JP | 2003306538 | 10/2003 |
| JP | 2003306541 | 10/2003 |
| JP | 2003306601 | 10/2003 |
| JP | 2004035659 | 2/2004 |
| JP | 2004035660 | 2/2004 |
| JP | 2004067733 | 3/2004 |
| JP | 2004149790 | 5/2004 |
| JP | 2004156055 | 6/2004 |
| JP | 2004-197088 | 7/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| KR | 9303713 | 5/1993 |
| KR | 120831 | 7/1995 |
| KR | 9707952 | 5/1997 |
| KR | 19970007952 | 5/1997 |
| KR | 2001089942 | 10/2001 |
| NL | 7113206 | 3/1972 |
| NL | 7113206 A | 3/1972 |
| SU | 374343 A | 3/1973 |
| SU | 374343 | 7/1973 |
| TW | 200413436 | 8/2004 |
| WO | WO 95/02504 A1 | 1/1995 |
| WO | WO 96/03163 | 2/1996 |
| WO | WO 97/28218 | 8/1997 |
| WO | WO 97/44376 | 11/1997 |
| WO | WO 98/41559 | 9/1998 |
| WO | WO 99/57173 | 11/1999 |
| WO | WO 01/14452 | 3/2001 |
| WO | WO 01/21680 | 3/2001 |
| WO | WO 01/46306 | 6/2001 |
| WO | WO 01/47688 | 7/2001 |
| WO | WO 01/90453 | 11/2001 |
| WO | WO 02/18472 | 3/2002 |
| WO | WO 02/31840 A1 | 4/2002 |
| WO | WO 02/051616 | 7/2002 |
| WO | WO 02/057335 A1 | 7/2002 |
| WO | WO 02/068497 | 9/2002 |
| WO | WO 02/072665 | 9/2002 |
| WO | WO 03/010225 A1 | 2/2003 |
| WO | WO 03-010226 | 2/2003 |
| WO | WO 03/010226 | 2/2003 |
| WO | WO 2004/013015 A1 | 2/2004 |
| WO | WO 2004/031258 | 4/2004 |
| WO | WO 2004/065452 | 8/2004 |
| WO | WO 2004/067616 A1 | 8/2004 |
| WO | WO 2004/074365 | 9/2004 |
| WO | WO 2004/075539 A1 | 9/2004 |
| WO | WO 2004/078825 | 9/2004 |
| WO | WO 2004/083294 | 9/2004 |
| WO | WO 2004/083294 A1 | 9/2004 |
| WO | WO 2004/101645 | 11/2004 |
| WO | WO 2005/035620 * | 4/2005 |
| WO | WO 2005/068531 | 7/2005 |
| WO | WO 2004/075550 | 8/2005 |
| WO | WO 2005/075539 | 8/2005 |
| WO | WO 2005/075550 A1 | 8/2005 |
| WO | WO 2005/082527 | 9/2005 |
| WO | WO 2005/095516 | 10/2005 |
| WO | WO 2005/110508 | 11/2005 |
| WO | WO 2006/028757 A2 | 3/2006 |
| WO | WO 2006/028770 | 3/2006 |
| WO | WO 2006/055198 | 5/2006 |
| WO | 2006/138406 | 12/2006 |
| WO | WO 2007/064312 | 6/2007 |
| WO | WO 2010/015810 | 2/2010 |

OTHER PUBLICATIONS

Office Action issued Jan. 12, 2012 in Mexico Application No. MX/a/2007015306.
Office Action issued Feb. 17, 2012 in European Patent Application No. 06 773 181.0-2115.
Search Report issued Apr. 30, 2012, in Malaysian Application No. PI 20062800.
Notice of Reasons for Rejection issued Jul. 3, 2012 in Japanese Patent Application No. 2008-517077 (with English translation).
Mexican Office Action Issued Jul. 24, 2012 in Patent Application No. MX/a/2007/015306.
Argentinean Office Action Issued Sep. 11, 2012 in Patent Application No. AR 056383 A1(partial English translation only).
Office Action issued Jan. 11, 2013 in European Patent Application No. 06 773 181.0.
Office Action issued Dec. 18, 2012 in Japanese Patent Application No. 2008-517077 (with English-language translation).
Office Action issued Jan. 15, 2013 in Korean Patent Application No. 10-2007-7029271 (with English-language translation).
Combined Taiwanese Office Action and Search Report issued Mar. 15, 2013 in Taiwanese Patent Application No. 095121208 (with English-language translation).
Abstract of EP 0581246 (Fuji Electric Co. Ltd., Feb. 2, 1994).
Abstract of EP 0699700 (Hoechst Aktien-Gesellschaft, Mar. 9, 1996).
Abstract of EP 1065230 (Arteva Technologies, Jan. 3, 2001).
Abstract of EP 1516892 (Toyo Boseki Kabushiki Kaisha, Mar. 23, 2005).
Abstract of JP 11071106 (Hitachi Chemical Co. Ltd., Mar. 16, 1999).
Abstract of JP 11152324 (Teijin Ltd., Jun. 8, 1999).
Abstract of JP 11181067 (Dainippon Resin Research Institute, Jul. 6, 1999).
Abstract of JP 11236440 (Mitsubishi Chemical Corp., Aug. 31, 1999).
Abstract of JP 2000128970 (Toyo Boseki. May 9, 2000).
Abstract of JP 2000128971 (Toyo Boseki, May 9, 2000).
Abstract of JP 2000129102 (Toyo Boseki, May 9, 2000).
Abstract of JP 2000226446 (Toyo Boseki, Aug. 15, 2000).
Abstract of JP 2000302854 (Toyo Boseki, Oct. 31, 2000).
Abstract of JP 2001026639 (Toyo Boseki, Jan. 30, 2001).
Abstract of JP 2001039707 (Keiogijuku, Feb. 13, 2001).
Abstract of JP 2001163964 (Toyo Boseki, Jun. 19, 2001).
Abstract of JP 2002322254 (Toyo Boseki, Nov. 8, 2002).
Abstract of JP 2002232258 (Toyo Boseki, Nov. 8, 2002).
Abstract of JP 2002332337 (Toyo Boseki, Nov. 22, 2002).
Abstract of JP 2003040992 (Mitsubishi Chem Corp., Feb. 13, 2003).
Abstract of JP 2003113230 (Toyo Boseki, Apr. 18, 2003).

(56) References Cited

OTHER PUBLICATIONS

Abstract of JP 2003113232 (Toyo Boseki, Apr. 18, 2003).
Abstract of JP 2003171454 (Toyo Boseki, Jun. 20, 2003).
Abstract of JP 2003171455 (Toyo Boseki, Jun. 20, 2003).
Abstract of JP 2003268628 (Toray Industries, Sep. 25, 2003).
Abstract of JP 2003301038 (Toyo Boseki, Oct. 21, 2003).
Abstract of JP 2003306601 (Toyo Boseki, Oct. 31, 2003).
Abstract of JP 2004035659 (Toyo Boseki, Feb. 5, 2004).
Abstract of JP 2004035660 (Toyobo Co. Ltd., Feb. 5, 2004).
Abstract of JP 2004067733 (Toyobo Co. Ltd., Mar. 4, 2004).
Abstract of JP 2004156055 (Toyobo Co. Ltd., Jun. 3, 2004).
Abstract of JP 2004197088 (Toyobo Co. Ltd., Jul. 15, 2004).
Abstract of JP 2004204138 (Mitsubishi Chem. Corp., Jul. 22, 2004).
Abstract of JP 2004224858 (Teijin Ltd., Aug. 12, 2004).
Abstract of JP 2004256633 (Toyo Boseki, Sep. 16, 2004).
Abstract of JP 2004323627 (Nippon Ester Co. Ltd., Nov. 18, 2004).
Abstract of JP 2005023160 (Toyo Boseki, Jan. 27, 2005).
Abstract of JP 2005047960 (Toyo Boseki, Feb. 24, 2005).
Abstract of JP 2005047961 (Toyo Boseki, Feb. 24, 2005).
Abstract of JP 2005047962 (Toyo Boseki, Feb. 24, 2005).
Abstract of JP 2005187556 (Toyo Boseki, Jul. 14, 2005).
Abstract of JP 2005187557 (Toyo Boseki, Jul. 14, 2005).
Abstract of JP 2005187558 (Toyo Boseki, Jul. 14, 2005).
Abstract of JP 2005187559 (Toyo Boseki, Jul. 14, 2005).
Abstract of JP 2005187560 (Toyo Boseki, Jul. 14, 2005).
Abstract of JP 2005187561 (Toyo Boseki, (Jul. 14, 2005).
Abstract of JP 2005213291 (Toyo Boseki, Nov. 8, 2005).
Abstract of JP 2005213292 (Toyo Boseki, Nov. 8, 2005).
Abstract of JP 2005213293 (Toyo Boseki, Nov. 8, 2005).
Abstract of JP 2005220234 (Toyobo Ltd., Aug. 18, 2005).
Abstract of JP 2194030 (Toray Ind. Inc., Jul. 31, 1990).
Abstract of JP 3146707 (Toray Industries, Jun. 21, 1991).
Abstract of JP 3161509 (Toray Industries, Jul. 11, 1991).
Abstract of JP 3292323 (Fuji Film Co., Ltd., Dec. 24, 1991).
Abstract of JP 4270727 (Daifoil Co. Ltd., Sep. 28, 1992).
Abstract of JP 5097990 (Teijin Ltd., Apr. 20, 1993).
Abstract of JP 5117379 (Kuraray Co. Ltd., May 14, 1993).
Abstract of JP 5287067 (Toray Industries, Nov. 2, 1993).
Abstract of JP 5511425 (Toray Ind., Sep. 5, 1980).
Abstract of JP 60139750 (Toray Ind., Jul. 24, 1985).
Abstract of JP 60291226 (Nippon Ester Co. Ltd., Nov. 1, 1985).
Abstract of JP 6031526 (Toyo Boseki, Feb. 18, 1985).
Abstract of JP 6184333 (Masaru Ibonai, Jul. 5, 1994).
Abstract of JP 6215618 (Tokay Carbon KK, Aug. 5, 1994).
Abstract of JP 62297318 (Toyo Co. Ltd., Dec. 24, 1987).
Abstract of JP 6271494 (Toyobo Co. Ltd., Sep. 27, 1994).
Abstract of JP 6279529 (Toray Industries, Oct. 4, 1994).
Abstract of JP 6306154 (Nippon Shokubai Co. Ltd., Nov. 1, 1994).
Abstract of JP 63264661 (Toyobo Co. Ltd., Nov. 1, 1988).
Abstract of JP 7268188 (Toyobo Co. Ltd., Oct. 17, 1995).
Abstract of JP 7292087 (Teijin Ltd., Nov. 7, 1995).
Abstract of JP 8003301 (Mitsubishi Heavy Ind., Jan. 9, 1996).
Abstract of JP 8238398 (Nippon Ester Co. Ld., Oct. 29, 1996).
Abstract of JP 8325364 (Polyplastics Co. Ltd., Dec. 10, 1996).
Abstract of JP 9040850 (Toray Industries, Feb. 10, 1997).
Abstract of JP 9183892 (GE Plastics Japan, Jul. 15, 1997).
Abstract of JP 9256220 (Toray Industries, Sep. 30, 1997).
Abstract of Jp 9272793 (Toray Industries, Oct. 21, 1997).
Abstract of KR 2001089941 (Kohap Co. Ltd., Oct. 17, 2001).
Abstract of WO 2002/72665 (Toyo Boseki, Sep. 19, 2002).
Abstract of WO 2004/031258 (Toray Industries, Apr. 15, 2004).
Abstract of WO 2004/078825 (Mitsubishi Chemical Company, Sep. 16, 2004).
Abstract of WO 2005/075539 (Toyo Boseki, Aug. 18, 2005).
Allport, D.C. and Mohajer, A.A., Block Copolymers, John Wiley & Sons, New York, 1973, pp. 264-270.
Billmeyer, Jr., Fred, "Methods for Estimating Intrnsic Viscosity," J. of Polymer Sci., 4, E./. du Pont de Nemours and Co., Arlington, New Jersey, pp. 83-86 (1949).
Billmeyer, Jr., Fred, "Principles of Color Technology, Describing Color," John Wiley and Sons, New York, 1981, pp. 25-66.
Boehm, A and Glaser, A., The quaterrylimides highly efficient NIR absorbers for plastics, ANTEC paper 2004, Chicago, IL, May 2004.
Copending U.S. Appl. No. 10/988,133, filed Nov. 12, 2004.
Copending U.S. Appl. No. 11/094,034, filed Mar. 30, 2005.
Copending U.S. Appl. No. 11/229,367, filed Sep. 16, 2005 (issued as U.S. Patent No. 7,655,746), Jernigan Feb. 2, 2010.
Encyclopedia of Chemical Technology, Fourth Edition, vol. 4, John Wiley & Sons New York, 1992, pp. 841-848.
Encyclopedia of Chemical Technology, Fourth Edition, vol. 4, John Wiley & Sons New York, 1997, pp. 423-430.
Encyclopedia of Chemical Technology, Fourth Edition, vol. 6, John Wiley & Sons New York, 1998, pp. 228-311.
Encyclopedia of Chemical Technology, Fourth Edition, vol. 12, John Wiley & Sons New York, 1998, pp. 863-881.
Encyclopedia of Chemical Technology, Fourth Edition, vol. 14, John Wiley & Sons New York, 1998, pp. 829-902.
Encyclopedia of Chemical Technology, Fourth Edition, vol. 16, John Wiley & Sons New York, pp. 925-962.
Encyclopedia of Chemical Technology, Fourth Edition, vol. 17, John Wiley & Sons New York, 1996, pp. 108-127.
Encyclopedia of Chemical Technology, Fourth Edition, vol. 17, John Wiley & Sons New York, 1998, pp. 1-67.
Encyclopedia of Chemical Technology, Fourth Edition, vol. 22, John Wiley & Sons New York, 1997, pp. 256-278.
Encyclopedia of Chemical Technology, Fourth Edition, vol. 23, John Wiley & Sons New York, 1997, pp. 676.
Encyclopedia of Chemical Technology, Fourth Edition, vol. 24, John Wiley & Sons New York, 1998, pp. 572-602.
Encyclopedia of Chemical Technology, Fourth Edition, vol. 24, "Titanium and Titanium Alloys," John Wiley & Sons New York, 1997, pp. 186-224.
Encyclopedia of Chemical Technology, Fourth Edition, vol. 24, "Titanium and Titanium Alloys," John Wiley & Sons New York, 1997, pp. 225-349.
Encyclopedia of Chemical Technology, Fourth Edition, vol. 24, "Titanium and Titanium Alloys," John Wiley & Sons New York, 1997, p. 801.
Encyclopedia of Chemical Technology, Fourth Edition, vol. 25, John Wiley & Sons New York, 1998, pp. 872-873.
Fuller, Carl W., Colored Iron Oxide Pigments, Synthetic Pigment Handbook, vol. 1, John Wiley & Sons, New York, 1973, pp. 323-349.
Int'l Search Report for U.S. Appl. No. 11/154,208, dated Dec. 16, 2006.
Kamatani, Konagaya, and Nakamura, "Effect of Phosphoric Acid on the Polycondensation of Bis(2-hydroxyethyl) Terephthalate Catalyzed by Sb(III) Compounds," Polymer J., vol. 12, No. 2, pp. 125-130 (1980).
Letter to Examiner Regarding Specification dated Mar. 11, 2009.
Liu et al., "Improving Oxygen Barrier Properties of Poly(ethylene terephthlate) by incorporating isophthalate. I. Effect of Orientation," J. of Applied Sci., 98(4), pp. 1615-1628 (Nov. 15, 2005).
Meerwein, Hans, "Increase in Ionization Capacity of Weak Electrolytes as a Result of Complex Formation and its Significance for Catalytic Processes, Annalen der Chemie," Chem. Inst. of Konigsberg Univ., vol. 455, pp. 222-253 (1927).
Meerwein, Hans and Bersin, Theodor, "Investigations of Metal Alcoholates and Ortho Acid Esters," Annalen der Chemie, Chem. Inst. of Marburg Univ., vol. 454765, pp. 113-150 (1929).
Office Action dated Jul. 14, 2008, in Russian Patent Application No. 2005141452.
Pierson, H.O., "Properties and Applications," Handbook of Carbon, Graphite, Diamond and Fullerenes, Noyes Publications, 1993, pp. 122-140.
Plastic Additivies Handbook, 5th Ed., Hanser Gardner Publications, 2001, pp. 123-136.
Research Disclosure 39771, May 1997.
Stewart, M.E., Cox, A.J., and Naylor, D.M., Reactive Processing of poly(ethylene 2,6-naphthalene dicarboxylate)/poly(ethylene terephthalate) Blends, vol. 34, No. 19, Polymer, Butterworth-Heinemann Ltd., 1993, pp. 4060-4067.

(56) References Cited

OTHER PUBLICATIONS

Terekhova, Mikhailov, and Tokareva, "Heat Stability of Polyethylene Terephthalate (PET) Containing Phosphoric Acid Esters," Khimicheskie Volokna, No. 4, pp. 1-6 (1964).
Terekhova and Petukhov, "Blocking of Terminal Groups of Polyethylene Terephthalate with o-Phosphoric Acid," Nauka I Tekhnika (Science and Technology), Synthetic Fibers, No. 2, pp. 1-5.
Toth, Louis E., Transition Metal Carbide and Nitrides, General Properties, Preparation and Characterization, Academic Press New York, 1971, p. 1-28.
U.S. Appl. No. 60/797,452, filed May 4, 2006.
U.S. Appl. No. 60/718,286, filed Sep. 16, 2005.
USPTO Notice of Allowance dated Apr. 14, 2010, in copending U.S. Appl. No. 11/361,487.
USPTO Notice of Allowance dated Jul. 15, 2010, in copending U.S. Appl. No. 12/611,380.
USPTO Notice of Allowance dated Sep. 1, 2010, in copending U.S. Appl. No. 11/495,431.
USPTO Office Action dated Apr. 29, 2008, in copending U.S. Appl. No. 11/229,238.
USPTO Office Action dated Aug. 12, 2010, in copending U.S. Appl. No. 11/095,834.
USPTO Office Action dated Aug. 19, 2010, in copending U.S. Appl. No. 11/229,238.
USPTO Office Action dated Aug. 20, 2008, in co-pending U.S. Appl. No. 11/094,034.
USTPO Office Action dated Dec. 18, 2008, in co-pending U.S. Appl. No. 11/229,238.
USPTO Office Action dated Jul. 21, 2010, in co-pending U.S. Appl. No. 11/500,862.
Weissmann, Mariana, et al., "Theoretical study of cabon-coated iron nanowires"; Physical Review B70, Am. Physical Soc., 201401-01 through 201401-04 (2004).
Zhang. Z.O. et al., "Shell/core structure and magnetic properties of carbon-coated Fe—Co© nanocapsules," J.of Physics: Condensed Matter, 13, Institute of Physics Publishing Ltd., pp. 1921-1929 (2001).
Abstract of AT 259232 (Chemiefaser Lenzing A.-G. Jan. 10, 1968).
Abstract of CN 1312218 A (Shanghai Inst—Ceramic Chem. Sep. 12, 2001).
Abstract of CN 1392174 A (Shanghai Petrochemical Co. Ltd Jan. 22, 2003).
Abstract of CN 1482154 A (Sinopec Yizheng Chemical Fibre Mar. 17, 2004).
Abstract of DE 1950553 A1 (M&T Chemicals Apr. 23, 1970).
Abstract of DE 19537930 A1 (Zimmer AG Apr. 17, 1997).
Abstract of DE 19841376 A1 (Finder, Horst Mar. 16, 2000).
Abstract of DE 3248840 A1 (Shaffer et al. Sep. 8, 1983).
Abstract of EP 0378154 A1 (Toray Indus. Inc. Jul. 18, 1990).
Abstract of EP 0429311 A2 (Imperial Chem. Indus. May 29, 1991).
Abstract of EP 0578464 Al (Polyplastics Co. Ltd. Jan. 12, 1994).
Abstract of EP 0634435 A1 (General Electric Co. Jan. 18, 1995).
Abstract of EP 1188783 A2 (Inventa-Fischer GmbH & Co. Mar. 20, 2002).
Abstract of EP 1431337 A2 (Eastman Chem. Co. Jun. 23, 2004).
Abstract of FR 2675654 A1 (Alcatel Alsthom Compagnie Gene Oct. 23, 1992).
Abstract of GB 1060401 A (Kurashiki Rayon Kabushiki Kais Mar. 1, 1967).
Abstract of GB 1236888 A (M&T Chems. Inc. Jun. 23, 1971).
Abstract of GB 1242636 A (Kanegafuchi Spinning Co. Ltd. Aug. 11, 1971).
Abstract of GB 1277264 A (Am. Home Prods. Corp. Jun. 7, 1972).
Abstract of GB 1285904 A (Kanegafuchi Spinning Co. Ltd. Aug. 16, 1972).
Abstract of GB 1351176 A (Dumont, Wilfrid A. Apr. 24, 1974).
Abstract of GB 2112827 A (Shaffer et al. Jul. 27, 1993).
Abstract of JP 06215618 (Tokai Carbon KK Aug. 5, 1994).
Abstract of JP 07058490 (Kitagawa Kogyo KK Mar. 3, 1995).
Abstract of JP 07292087 (Teijin Ltd. Nov. 7, 1995).
Abstract of JP 10316765 (Unitika Ltd. Dec. 2, 1998).
Abstract of JP 11005892 (Unitika Ltd. Jan. 12, 1998).
Abstract of JP 11349868 A (Bayer AG Dec. 21, 1991).
Abstract of JP 1996073581 (Hoechst Aktiengesellschaft Mar. 19, 1996).
Abstract of JP 2001039707 (Mitsui Chems. Inc. Feb. 20, 2001).
Abstract of JP 2001048972 A (Mitsui Chems. Inc. Feb. 20, 2001).
Abstract of JP 2001098418 A (Toyo Boseki Apr. 10, 2001).
Abstract of JP 2001225474 (Toyobo Co. Ltd. Aug. 21, 2001).
Abstract of JP 2001262016 (Sumitomo Metal Mining Co. Sep. 26, 2001).
Abstract of JP 2001278970 A (Toyo Boseki Oct. 10, 2001).
Abstract of JP 2001354759 A (Toyo Boseki Dec. 25, 1991).
Abstract of JP 2002249569 A (Toyo Boseki Sep. 6, 2002).
Abstract of JP 2002249648 (Yuka Denshi Co. Ltd. Sep. 6, 2002).
Abstract of JP 2002249653 (Mitsubishi Chemicals Corp. Sep. 6, 2002).
Abstract of JP 2003301090 (Toyo Boseki Oct. 21, 2003).
Abstract of JP 2003301093 (Toyo Boseki Oct. 21, 2003).
Abstract of JP 2003306536 (Toyo Boseki Oct. 31, 2003).
Abstract of JP 2003306541 (Toyo Boseki Oct. 31, 2003).
Abstract of JP 2004149790 (Toyo Boseki May 27, 2004).
Abstract of JP 2194030 (Toray Indus. Inc. Jul. 31, 1990).
Abstract of JP 2214734 A (Toray Indus. Aug. 21, 1990).
Abstract of JP 4270727 A (Diafoil-Hoechst Co. Ltd. Sep. 28, 1992).
Abstract of JP 4370142 (Toyo Boseki Dec. 22, 1992).
Abstract of JP 46040711 (Unitika).
Abstract of JP 46040714 (Asahi Chem. Ind. Co.).
Abstract of JP 46041025 (Asahi Chem. Indus. Dec. 3, 1971).
Abstract of JP 46041033 (Asahi Chen. Indus. Co. Ltd. Dec. 3, 1971).
Abstract of JP 47039497 A (Mitsubishi Rayon Co. Ltd. Nov. 29, 1972).
Abstract of JP 47042989 (Mitsubishi Rayon Co. Ltd. Dec. 26, 1972).
Abstract of JP 48005798 A (Akzo NV Feb. 20, 1973).
Abstract of JP 48007272 (Teijin Ltd. Mar. 3, 1973).
Abstract of JP 48026955 A (Dumont et al. Apr. 9, 1973).
Abstract of JP 48031991 (Unitika Ltd. Oct. 3, 1973).
Abstract of JP 48038634 (Mitsubishi Rayon Co. Nov. 19, 1973).
Abstract of JP 48038635 (Mitsubishi Rayon Co. Ltd. Nov. 19, 1973).
Abstract of JP 48038637 (Mitsubishi Rayon Co. Ltd. Nov. 19, 1973).
Abstract of JP 48044959 (Unitika Ltd. Dec. 27, 1973).
Abstract of JP 48045015 (Toyo Spinning Co. Ltd. Apr. 27, 1974).
Abstract of JP 48045784 (Asahi Chem. Indus. Co. Aug. 9, 1973).
Abstract of JP 48056782 (Asahi Chem. Indus. Co., Ltd. Aug. 9, 1973).
Abstract of JP 48056783 (Asahi Chem. Indus. Co., Ltd. Aug. 9, 1973).
Abstract of JP 48079898 (Kuraray Co. Ltd. Oct. 26, 1973).
Abstract of JP 48099133 (Asahi Chem. Ind. Co. Ltd. Dec. 15, 1973).
Abstract of JP 48102191 (Asahi Chem. Ind. Co. Ltd. Dec. 22, 1973).
Abstract of JP 49005918 A (Unilever NV Jan. 19, 1974).
Abstract of JP 49006835 (Japan Ester Co. Feb. 16, 1974).
Abstract of JP 49006839 (Mitsubishi Chem. Indus. Co. Feb. 16, 1974).
Abstract of JP 49009116 (Mitsubishi Rayon Co. Ltd. Mar. 1, 1974).
Abstract of JP 49010834 A (Armco Steel Corp. Jan. 30, 1974).
Abstract of JP 49032676 (FMC Corp. Sep. 2, 1974).
Abstract of JP 49045014 A (Toyo Spinning Co. Ltd. Apr. 27, 1974).
Abstract of JP 50039711 A (Matsushita Elec. Indus. Co. Apr. 12, 1975).
Abstract of JP 5010196 (Yoshimura et al. Apr. 18, 1975).
Abstract of JP 505735 (Iwazaki, Tokuhara Mar. 6, 1975).
Abstract of JP 5097990 (Teijin Apr. 20, 1993).
Abstract of JP 51042795 (Toray Indus. Inc. Apr. 12, 1976).
Abstract of JP 51127195 A (Mitsubishi Chem. Indus. Nov. 5, 1976).
Abstract of JP 51145594 (Kuraray Co. Dec. 14, 1976).
Abstract of JP 52039790 A (Teijin Ltd. Mar. 28, 1977).
Abstract of JP 52105591 (Eastman Kodak Co. Sep. 5, 1977).
Abstract of JP 52123489 A (Toray Indus. Oct. 17, 1977).
Abstract of JP 52129798 A (Mitsubishi Rayon Co. Ltd. Oct. 31, 1977).
Abstract of JP 52129799 A (Mitsubishi Rayon Co. Ltd. Oct. 31, 1977).

(56) References Cited

OTHER PUBLICATIONS

Abstract of JP 53051294 A (Mitsubishi Rayon Co. Ltd. May 10, 1978).
Abstract of JP 53051295 A (Mitsubishi Rayon Co. Ltd. May 10, 1978).
Abstract of JP 53052595 A (Nippon Ester Co. Ltd. May 13, 1978).
Abstract of JP 53105591 A (Nippon Ester Co. Ltd. Sep. 13, 1978).
Abstract of JP 54135896 A (Nippon Ester Co. Ltd. Oct. 22, 1979).
Abstract of JP 54163996 A (Nippon Ester Co. Ltd. Dec. 27, 1979).
Abstract of JP 55089332 A (Nippon Ester Co. Ltd. Jul. 5, 1980).
Abstract of JP 55149320 (Nippon Ester Co. Ltd. Nov. 20, 1980).
Abstract of JP 56008431 (Nippon Ester Co. Ltd. Jan. 28, 1981).
Abstract of JP 56149423 (Nippon Ester Co. Ltd. Nov. 19, 1981).
Abstract of JP 56159248 A (Mitsubishi Rayon Co. Dec. 8, 1981).
Abstract of JP 57038609 (Teijin Ltd. Mar. 3, 1982).
Abstract of JP 58109532 A (Nippon Ester Co. Ltd. Jun. 29, 1983).
Abstract of JP 59015427 A (Toray Ind. Jan. 26, 1984).
Abstract of JP 59051295 (Kyowa Hakko Kogyo KK Mar. 24, 1984).
Abstract of JP 60264313 A (Teikoku Kako Co. Ltd. Dec. 27, 1985).
Abstract of JP 6100679 A (Kuraray Co. Ltd. Apr. 12, 1994).
Abstract of JP 6220173 A (Teijin Ltd. Aug. 9, 1994).
Abstract of JP 63237207 A (Ube Indus. Ltd. Oct. 3, 1988).
Abstract of KR 9303713 (Cheil Synthetics May 8, 1993).
Abstract of WO 01/90453 (Zimmer AG Nov. 29, 2001).
Abstract of WO 1995/02504 (Chomerics, Inc. Jan. 26, 1995).
Abstract of WO 2002/057335 (Toyobo Co. Ltd. Jul. 25, 2002).
Abstract of WO 2004/031258 (Toray Indus. Inc. Apr. 15, 2004).
Abstract of WO 2004075539 A1 (Sony Corp. et al. Sep. 2, 2004).
Abstract of WO 2005/028770 (Eastman Chem. Co. Mar. 16, 2006).
Abstract of WO 2005/075550 (Van Den Bogerd et al. Aug. 18, 2005).
Abstract of WO 2005/11058 (Hossainy et al. Nov. 24, 2005).
Adams, C.G. and Stein, R.S., "Some Studies of the Crystallization of Polychlorotrifluoroethylene Copolymer Films," J. Polymer Sci. A-2, vol. 6, pp. 31-61 (1968).
ASTM Designation: F May 2013, "Standard Test Method for Determination of Residual Acetaldehyde in Polyethylene Terephthalate Bottle Polymer Using an Automated Static Head-Space Sampling Device and a Capillary GC with a Flame Ionization Detector," pp. 1-9.
Chen, Jinyuan et al., "Preparation of Nanosized Titania Powder via the Controlled Hydrolysis of Titanium Alkoxide," J. Materials Sci. 31, pp. 3497-3500 (1996).
Encyclopedia of Chemical Technology, Fourth Edition, vol. 23, "Tantalum and Tantalum Compounds," John Wiley & Sons New York, 1997, pp. 658-660.
Encyclopedia of Chemical Technology, Fourth Edition, vol. 24, "Titanium Compounds," John Wiley & Sons New York, 1997, pp. 225-349.
Encyclopedia of Chemical Technology, Fourth Edition, vol. 3, "Antimony and Antimony Alloys," John Wiley & Sons New York, 1997, pp. 368-370.
Encyclopedia of Chemical Technology, Fourth Edition, vol. 4, "Activated Carbon," John Wiley & Sons New York, 1997, pp. 1015-1037.
Encyclopedia Polymer Sci. & Eng'g, vol. 11, "Phosphorus-Containing Polymers," John Wiley & Sons, Inc., 1988, pp. 96-99.
Encyclopedia Polymer Sci. & Eng'g, vol. 12, John Wiley & Sons, Inc., 1988, pp. 226-227.
European Search Report for Application No. EP 05004945, mailed Jun. 16, 2005, cited in U.S. Appl. No. 11/361,487.
Hoven Kamp, S.G., "Kinetic Aspects of Catalyzed Reactions in the Formation of Poly(ethylene terephthalate)," J. Polymer Sci., Part A-1, vol. 9, pp. 3617-3625 (1971).
http://www.americanelements.com, obtained from the internet on Mar. 4, 2009.
Int'l Search Report & Written Opinion for International Application No. PCT/US06/34484, corresponding to U.S. Appl. No. 11/229,367, mailed Apr. 9, 2007.
Int'l Search Report & Written Opinion for International Application No. PCT/US2005/030551, mailed Feb. 16, 2006, cited in U.S. Appl. Nos. 11/095,834, 11/228,672, and 11/229,367.
Int'l Search Report & Written Opinion for International Application No. PCT/US2005/030657, mailed Feb. 1, 2006, cited in U.S. Appl. Nos. 11/229,367 and 11/228,672.
Int'l Search Report & Written Opinion for International Application No. PCT/US2005/030834, mailed Feb. 15, 2007, cited in U.S. Appl. Nos. 11/229,367, 11/228,672, and 11/229,367.
Int'l Search Report & Written Opinion for International Application No. PCT/US2005/038606, corresponding to U.S. Appl. No. 10/988,263, mailed Apr. 7, 2006, cited in U.S. Appl. No. 11/229,367.
Int'l Search Report & Written Opinion for International Application No. PCT/US2005/038730, mailed Feb. 28, 2006, cited in U.S. Appl. Nos. 11/095,834, 11/228,672, and 11/229,367.
Int'l Search Report & Written Opinion for International Application No. PCT/US2005/038999, mailed Aug. 14, 2007, cited in U.S. Appl. Nos. 11/095,834 and 11/229,367.
Int'l Search Report & Written Opinion for International Application No. PCT/US2006/003874, corresponding to U.S. Appl. No. 11/054,194, mailed May 17, 2006, cited in U.S. Appl. No. 11/229,367.
Int'l Search Report & Written Opinion for International Application No. PCT/US2006/023207, corresponding to U.S. Appl. No. 11/154,208, mailed Dec. 19, 2006, cited in U.S. Appl. No. 11/229,367.
Int'l Search Report & Written Opinion for International Application No. PCT/US2006/034412, mailed Feb. 13, 2007, cited in U.S. Appl. Nos. 11/095,834, 11/228,672, and 11/229,367.
Int'l Search Report & Written Opinion for International Application No. PCT/US2006/034413, corresponding to U.S. Appl. No. 11/228,773, mailed Nov. 17, 2006, cited in U.S. Appl. No. 11/229,367.
Int'l Search Report & Written Opinion for International Application No. PCT/US2006/034484, mailed Apr. 9, 2007, cited in U.S. Appl. No. 11/229,367.
Int'l Search Report & Written Opinion for International Application No. PCT/US2006/034524, mailed Nov. 22, 2006, cited in U.S. Appl. Nos. 11/500,862 and 11/299,367.
Int'l Search Report & Written Opinion for International Application No. PCT/US2006/034543, mailed Aug. 20, 2007, cited in U.S. Appl. Nos. 11/229,367 and 11/500,862.
Int'l Search Report & Written Opinion for International Application No. PCT/US2006/034551, mailed Jan. 15, 2007, cited in U.S. Appl. Nos. 11/229,367 and 11/500,862.
Int'l Search Report & Written Opinion for International Application No. PCT/US2006/034616, mailed Sep. 27, 2007, cited in U.S. Appl. Nos. 11/095,834 and 11/229,238.
Int'l Search Report & Written Opinion for International Application No. PCT/US2006/09692, mailed Jun. 26, 2006, cited in U.S. Appl. Nos. 11/095,834, 11/228,672, and 11/229,367.
Int'l Search Report & Written Opinion for International Application No. PCT/US2006/23206, mailed Dec. 5, 2006, cited in U.S. Appl. No. 11/154,146.
Int'l Search Report & Written Opinion for International Application No. PCT/US2006/23206, mailed Sep. 3, 2007, cited in U.S. Appl. No. 11/154,146.
Int'l Search Report & Written Opinion for International Application No. PCT/US2007/09914, mailed Sep. 3, 2007, cited in U.S. Appl. No. 11/229,367.
Int'l Search Report & Written Opinion for International Application PCT/US2005/042471, mailed Mar. 14, 2006, cited in U.S. Appl. Nos. 11/095,834, 11/228,672, and 11/229,367.
Letter to Examiner Regarding Specification, dated Mar. 11, 2009.
Li, Jingguo et al., "Synthesis of Nanocrystalline Titanium Nitride Powders by Direct Nitridation of Titanium Oxide," J. Am. Ceramic Soc'y, vol. 84, No. 12, pp. 3045-3047 (2001).
Love, Charles, "Colored Iron Oxide Pigments, Natural," Pigment Handbook, vol. 1, John Wiley & Sons New York, 1973, pp. 323-349.
Novelty Search for Chinese Application No. GCC/P/2005/4378, State Intellectual Property Office of the Peoples Republic of China, mailed Dec. 18, 2008, cited in U.S. Appl. No. 11/361,487.
Office Action issued by Russian Patent Office on Jul. 14, 2008, in U.S. Appl. No. 2005/141,452, filed May 25, 2004, cited in U.S. Appl. No. 11/095,834.

(56) References Cited

OTHER PUBLICATIONS

Peelamedu, Ramesh et al., "TiN from TiO2 via Cycling Microwave," Am. Ceramic Soc'y Bulletin, vol. 81, No. 8, pp. 57-60 (Aug. 2002).
Potschke, Petra et al., "Rheological Behavior of Multiwalled Carbon Nanotube/Polycarbonate Composites," Polymer 43, pp. 3247-3255 (2002).
Research Disclosure, "Titanium Catalyst for Polyester Synthesis," p. 4, (Mar. 1978).
Search Report for Malaysian Patent Application No. PI 20050947, Intellectual Porperty Corporation of Malaysia, mailed Aug. 14, 2009, cited in U.S. Appl. No. 11/361,487.
Search Report for Singapore Patent Application No. 2005/01246-3, Intellectual Property Office of Singapore, mailed Mar. 3, 2006, cited in U.S. Appl. No. 11/361,487.
Shaviv, Roey, "Synthesis of TiNxCy: Optimization of Reaction Parameters," Materials Sci. & Eng'g A209, pp. 345-352 (1996).
The Merck Index, An Encyclopedia of Chemicals, Drugs, and Biologicals, Fourteenth Edition, Marydale J. O'Neil et al. eds., Merck & Co., Inc. 2006, p. 1628.
Tomita, Kosuke, "Studies on the Formation of Poly(ethylene) Terephthalate: 6. Catalytic Activity of Metal Compounds in Polycondensation of Bis(2-hydroxyethyl) Terephthalate," Polymer, vol. 17, pp. 221-224 (1976).
USPTO Action dated Oct. 16, 2008, in copending U.S. Appl. No. 11/095,834.
USTPO Non-Final Office Action dated Sep. 26, 2007, in copending U.S. Appl. No. 11/361,487.
USPTO Office Action dated Apr. 2, 2009, in copending U.S. Appl. No. 11/500,862.
USPTO Office Action dated Apr. 6, 2009, in copending U.S. Appl. No. 11/229,367.
USPTO Office Action dated Apr. 8, 2008, in copending U.S. Appl. No. 11/361,487.
USPTO Office Action dated Aug. 1, 2005, in copending U.S. Appl. No. 11/094,034.
USPTO Office Action dated Dec. 1, 2005, in copending U.S. Appl. No. 10/796,238.
USPTO Office Action dated Dec. 15, 2008, in copending U.S. Appl. No. 11/495,431.
USPTO Office Action dated Dec. 30, 2009, in copending U.S. Appl. No. 11/495,431.
USPTO Office Action dated Feb. 5, 2010, in copending U.S. Appl. No. 11/500,862.
USPTO Office Action dated Jan. 28, 2009, in copending U.S. Appl. No. 11/095,834.
USPTO Office Action dated Jan. 25, 2008, in copending U.S. Appl. No. 11/229,367.
USPTO Office Action dated Jul. 21, 2010, in copending U.S. Appl. No. 11/500,862.
USPTO Office Action dated Jul. 24, 2007, in copending U.S. Appl. No. 11/361,655.
USPTO Office Action dated Jul. 19, 2006, in copending U.S. Appl. No. 11/361,655.
USPTO Office Action dated Jul. 31, 2008, in copending U.S. Appl. No. 11/361,487.
USPTO Office Action dated Jun. 10, 2009, in copending U.S. Appl. No. 11/361,487.
USPTO Office Action dated Jun. 4, 2009, in copending U.S. Appl. No. 11/495,431.
USPTO Office Action dated Jun. 9, 2008, in copending U.S. Appl. No. 11/495,431.
USPTO Office Action dated May 15, 2008, in copending U.S. Appl. No. 11/229,367.
USPTO Office Action dated May 17, 2006, in copending U.S. Appl. No. 10/796,238.
USPTO Office Action dated May 28, 2008, in copending U.S. Appl. No. 11/095,834.
USPTO Office Action dated May 4, 2006, in copending U.S. Appl. No. 11/361,487.
USPTO Office Action dated Sep. 11, 2009, in copending U.S. Appl. No. 11/095,834.
USPTO Office Action dated Sep. 29, 2008, in copending U.S. Appl. No. 11/500,862.
USPTO Rejection dated Dec. 12, 2008, in copending U.S. Appl. No. 11/495,431.
USPTO Rejection dated Jan. 22, 2007, in copending U.S. Appl. No. 11/228,672.
USPTO Rejection dated Jul. 20, 2006, in copending U.S. Appl. No. 11/228,672.
Wilfong, R.E., "Linear Polyesters," J. Polymer Sci., vol. 54, pp. 385-410 (1961).
Yuki, K., "Saturated Polyester Resin Handbook," pp. 217-228, 593-594 (1989).
International Search Report from co-pending U.S. Appl. No. 11/495,431; International Application No. PCT/US06/34616.
Office Action dated Jan. 30, 2007 from co-pending U.S. Appl. No. 11/361,655.
Office Action dated May 14, 2007 from co-pending U.S. Appl. No. 11/229,367.
Office Action dated Aug. 2, 2006 from co-pending U.S. Appl. No. 11/229,367.
Office Action dated Jan. 18, 2007 from co-pending U.S. Appl. No. 11/229,367.
Co-pending U.S. Appl. No. 11/495,431, filed Jul. 28, 2006.
Co-pending U.S. Appl. No. 11/500,862, filed Aug. 8, 2006.
Terekhova, Mikhailov, Tokareva; Heat Stability of Polyethylene Terephthalate (PET) Containing Phosphoric Acid Esters; Khimicheskie Volokna; 1964; pp. 1-6; No. 4.
Terekhova, Petukhov; Blocking of Terminal Groups of Polyethylene Terephthalate with o-Phosphoric Acid; Nauka I Tekhnika (Science and Technology): Synthetic Fibers; pp. 1-5; No. 2.
Kamatani, Konagaya, Nakamura; Effect of Phosphoric Acid on the Polycondensation of Bis(2-hydroxyethyl) Terephthalate Catalyzed by Sb(III) Compounds; Polymer Journal; 1980; pp. 125-130; vol. 12; No. 2.
Hans Meerwein and Theodor Bersin, Investigations of Metal Alcoholates and Ortho Acid Esters, Annalen der Chemie, Chemical Institute of Marburg University, 1929, pp. 113-150, vol. 454765.
Hans Meerwein, Increase in Ionization Capacity of Weak Electrolytes as a Result of Complex Formation and its Significance for Catalytic Processes, Annalen der Chemie, Chemical Institute of Konigsberg University, 1927, pp. 222-253, vol. 455.
Plastic Additives Handbook $5^{th}$ Ed., 2001, pp. 123-136, Hanser Gardner Publications.
Fred W. Billmeyer, Jr., Methods for Estimating Intrinsic Vicosity, Journal of Polymer Science, 4, 1949, pp. 83-86, E.I. du Pont de Nemours and Co., Arlington, New Jersey.
Fred W. Billmeyer, Jr., Principles of Color Technology, Describing Color, 1981, pp. 25-66, John Wiley and Sons, New York.
Kirk Othmer, Titanium and Titanium Alloys, Encyclopedia of Chemical Technology, vol. 24, $4^{th}$ Ed., 1997, pp. 186-224; 225-349 and 801.
Louis E. Toth, Transition Metal Carbide and Nitrides, General Properties, Preparation and Characterization, 1971, p. 1-28, Academic Press New York + p. 87.
Kirk Othmer, Encyclopedia of Chemical Technology, vol. 17, $4^{th}$ Ed., 1996, pp. 108-127.
Kirk Othmer, Encyclopedia of Chemical Technology, vol. 4, $4^{th}$ Ed., 1992, pp. 841-848.
Kirk Othmer, Encyclopedia of Chemical Technology, vol. 4, $4^{th}$ Ed., 1997, pp. 423-430.
Kirk Othmer, Encyclopedia of Chemical Technology, vol. 25, $4^{th}$ Ed., 1998, pp. 872-873.
Kirk Othmer, Encyclopedia of Chemical Technology, vol. 23, $4^{th}$ Ed., 1997, p. 676.
Kirk Othmer, Encyclopedia of Chemical Technology, vol., 6, $4^{th}$ Ed., 1998, pp. 228-311.
Kirk Othmer, Encyclopedia of Chemical Technology, vol. 24, $4^{th}$ Ed., 1998, pp. 572-602.
Kirk Othmer, Encyclopedia of Chemical Technology, vol. 14., $4^{th}$ Ed., 1998, pp. 829-902.

(56) References Cited

OTHER PUBLICATIONS

Kirk Othmer, Encyclopedia of Chemical Technology, vol. 17, 4$^{th}$ Ed., 1998, pp. 1-42; 43-67.
Kirk Othmer, Encyclopedia of Chemical Technology, vol. 12, 4$^{th}$ Ed., 1998, pp. 863-881.
Kirk Othmer, Encyclopedia of Chemical Technology, vol. 22, 4$^{th}$ Ed., 1997, pp. 256-278.
Kirk Othmer, Encyclopedia of Chemical Technology, vol. 16, 4$^{th}$ Ed., pp. 925-962.
D.C. Allport and A.A. Mohajer, Block Copolymers, 1973, pp. 264-270, John Wiley and Sons, New York.
M.E. Stewart, A.J. Cox, D.M. Naylor, Reactive Processing of poly-(ethylene 2,6-naphthalene dicarboxylate)/poly(ethylene terephthalate) Blends, Polymer, 1993, pp. 4060-4067, vol. 34, No. 19; Butterworth-Heinemann Ltd.
Li U et al., Improving Oxygen Barrier Properties of Poly(ethylene terephthlate) by incorporating isophthalate. I. Effect of Orientation, Journal of Applied Science, Nov. 15, 2005, 98(4), pp. 1615-1628, Wiley Periodicals, Inc.
Co-pending U.S. Appl. No. 60/718,286, filed Sep. 16, 2005.
Co-pending U.S. Appl. No. 11/154,208, filed Jun. 16, 2005.
Co-pending U.S. Appl. No. 11/229,367, filed Sep. 16, 2005.
Co-pending U.S. Appl. No. 11/154,146, filed Jun. 16, 2005.
Co-pending U.S. Appl. No. 11/095,834, filed Mar. 31, 2005.
Co-pending U.S. Appl. No. 11/228,672, filed Sep. 16, 2005, CIP of U.S. Appl. No. 11/094,034, filed Mar. 30, 2005, CIP of U.S. Appl. No. 10/988,133, filed Nov. 12, 2004.
Co-pending U.S. Appl. No. 11/229,238, filed Sep. 16, 2005.
Research Disclosure 39771; Anonymous; May 1997.
A. Boehm and A. Glaser, The quaterrylimides—highly efficient NIR absorbers for plastics, ANTEC paper 2004, Chicago, IL, May 2004.
Wu, S., A Generalized Criterion for Rubber Toughening: The Critical Matrix Ligament Thickness, Journal of Applied Polymer Science, vol. 35, pp. 549-561, 1988, John Wiley and Sons.
Weissmann, Mariana, et al.; "Theoretical study of cabon-coated iron nanowires"; Physical Review B70, 201401-1 through 201401-4; 2004; The American Physical Society.
Zhang, Z.D. et al.; "Shell/core structure and magnetic properties of carbon-coated Fe—Co© nanocapsules"; Journal of Physics: Condensed Matter 13; 1921-1929; 2001; Institute of Physics Publishing Ltd.
Encyclopedia of Chemical Technology; 4$^{th}$ Ed; vol. 4; pp. 1015-1037; John Wiley and Sons, New York.
Pierson, H.O.; Handbook of Carbon, Graphite, Diamond and Fullerenes: Properties and Applications; pp. 122-140; Noyes Publications; 1993.
Charles H. Love (Retired), Colored Iron Oxide Pigments, Natural pp. 323-332.
Carl W. Fuller, Colored Iron Oxide Pigments, Synthetic, Pigment Handbook, 1973, pp. 333-349, vol. 1, John Wiley & Sons, New York.
Co-pending U.S. Appl. No. 10/796,238, filed Mar. 9, 2004.
International Search Report.
Office Action dated Sep. 26, 2007 from co-pending U.S. Appl. No. 11/361,487.
Co-pending U.S. Appl. No. 11/361,487, filed Feb. 24, 2006.
Co-pending U.S. Appl. No. 11/361,655, filed Feb. 24, 2006.
International Search Report from co-pending U.S. Appl. No. 11/229,367, filed Sep. 16, 2005.
Office Action mailed Apr. 3, 2007 from co-pending U.S. Appl. No. 11/361,487, filed Feb. 24, 2006.
Office Action dated Jan. 30, 2007 from co-pending U.S. Appl. No. 11/361,655.
Office Action dated Sep. 26, 2006, from co-pending U.S. Appl. No. 11/361,487.
Office Action dated Sep. 26, 2006, from co-pending U.S. Appl. No. 10/796,238.
Office Action issued Apr. 28, 2014 in IN application No. 9417/DELNP/2007.
Japanese Office Action mailed Jul. 1, 2014 in Patent Application No. 2013-087338.

\* cited by examiner

HIGH INTRINSIC VISCOSITY MELT PHASE POLYESTER POLYMERS WITH ACCEPTABLE ACETALDEHYDE GENERATION RATES

The present application is a Divisional application of Ser. No. 11/154,208 having a filing date of Jun. 16, 2005.

1. FIELD OF THE INVENTION

The invention pertains to polyester polymers having a high intrinsic viscosity obtained in the melt phase, and more particularly to high intrinsic viscosity polyester polymers polycondensed with an antimony catalyst in the melt phase having an acceptable acetaldehyde content after melt processing without the addition of an acetaldehyde scavenger.

2. BACKGROUND OF THE INVENTION

Polyester polymer made in a melt phase manufacturing process contains acetaldehyde, and such polymers subsequently remelted generate additional amounts of acetaldehyde. Acetaldehyde is undesirable because it imparts a noticeable taste, problematic in carbonated soft drink and water packaging. The formation of acetaldehyde is a two-step reaction. In the first step, thermal degradation of the polyester chain results in the creation of acetaldehyde precursors. In the second step, acetaldehyde precursors react to form acetaldehyde. The presence of acetaldehyde ("AA") in preforms and bottles can be traced to two sources. The first source of AA is produced in the melt phase process for manufacturing the polymer. This class of AA is called residual or free AA and is the actual measurable amount of AA present on or in polyester polymer pellets that have undergone both AA reaction steps in the melt phase for making the polyester polymer. However, in the melt phase process for manufacturing the polymer, thermally degraded polyester chains (first step) produce AA precursors, e.g. species having vinyl end groups, and not all of these AA precursors progress to the second reaction step to form AA in melt phase manufacturing. These AA precursors as discussed further below may, however, react to form AA at a later time upon remelting the polyester polymer pellets to make molded articles.

With all other parameters being equal, the amount of AA generated in the melt phase manufacture and the number of AA precursors made in the melt phase manufacture increases dramatically as the IV (or molecular weight) of the polymer increases. To prevent the build up of AA and AA precursors to unacceptable levels, the polycondensation of the polymer is continued to a limited extent such that the polymer is made to a low IV in the melt phase, solidified, and then further polymerized in the solid state under low oxygen conditions and temperatures sufficiently low enough to prevent the polymer from melting.

The second source of AA is the additional amount of AA generated when the polyester solids are melted in a melt processing zone (e.g. extruder or injection molding machine) by converters to make bottle preforms. AA precursors present in the solids are converted to AA upon under melting conditions to generate more AA than originally present in the solid polyester particles fed to the melt processing zone (second AA reaction step). In addition, the additional melt history in processing zone can result in more thermal degradation of the polyester chain (more of the first AA reaction step); therefore, additional AA precursors can be formed and react to form AA (more of the second AA step). This phenomena is known as AA generation rate. Thus, it is possible to reduce the amount of residual or free AA present in the pellets to a value of 5 ppm or less, or even 3 ppm or less, and yet produce a preform, made in an injection molding machine with a barrel temperature of 285° C. and a melt residence time of about 108 seconds, containing higher levels of AA at 13 ppm. When the preforms are blown into bottles, the high AA levels can adversely impact the taste of the beverage contained in the said bottles.

There are several causes for the formation of residual AA and AA precursors which produce high AA generation rates. One cause is that if the polycondensation catalyst used in the melt phase is not adequately stabilized and/or deactivated in the solid polyester polymer, it can, during re-melting in a melt processing zone, continue to catalyze the conversion of AA precursors present in the polymer to form AA during melt processing. Adequately stabilizing and/or deactivating the polycondensation catalyst, therefore, reduces the amount of AA generated during melt processing (reduces the AA generation rate), even though AA precursors may be present in the melt. While catalyst stabilization and/or deactivation does reduce the AA generated in subsequent melt processing steps, some AA is nevertheless generated by virtue of the heat applied to melt the polymer causing more thermal degradation and by a lower level of catalytic activity that may remain to convert some of the AA precursor species to AA. Moreover, the ease to which catalyst metals can be deactivated differs from metal to metal. For example, Sb metal based catalysts require stronger acids at higher levels to deactivate.

Another cause for the formation of residual AA and AA precursors is the thermal degradation of the polyester polymers in the melt phase which becomes more prevalent as the IV of the polymer is increased at high temperatures. When solid-state polymerization is not used to increase the molecular weight, a longer melt-phase residence time may be necessary to produce the molecular weight needed to blow bottles from preforms having the required properties. This extended melt-phase exposure increases the extent of thermal degradation; therefore, producing PET exclusively in the melt phase with acceptable free AA and/or acceptable AA generation rate during subsequent molding is much more challenging than the conventional scenario where a portion of the molecular build-up occurs in a solid-phase process. Along with a shorter melt-phase step which generates fewer AA precursors, conventional processes have the added advantage of the solid-stating gas sweeping away most of the free AA.

The problem of controlling the presence of AA and AA precursors produced in the melt-phase manufacture was discussed in EP 1 188 783 A2, equivalent to U.S. Pat. No. 6,559,271 B2. This patent proposes that the amount of AA and AA precursors can be limited by keeping the reaction temperature during the entire polycondensation step below 280° C., by using a highly active titanium catalyst at low dosage to limit the residence time of the polymer in the melt-phase manufacture, and by using an excess of AA scavenger added in the melt phase manufacture. Noting that it was particularly important to use highly active catalysts at low reaction temperatures, the use of Sb catalysts was found to be a compromise between reactivity and selectivity, whereas highly active catalysts such as Ti were found to be a better compromise at low dosages and low reaction temperatures. To control AA generation from AA precursors produced in the melt phase manufacture, this patent teaches deactivating the catalyst with a phosphorus compound late toward or after the end of polycondensation so as to allow the catalyst to promote the molecular weight build-up to a intrinsic viscosity (It.V.) of 0.63 dL/g and higher. Finally, the amount of the AA scavenger or binder added must be in excess so as to bind not only the residual or free AA produced in the melt phase manufacture, but to also bind whatever AA is generated in subsequent melt processing steps.

The problem with the approach of using an acetaldehyde scavenger is that they are expensive regardless of when they are added. The problem of adding acetaldehyde scavengers to the melt phase manufacture is that a portion of the scavenger is consumed by the free acetaldehyde present in the melt phase manufacture, thereby requiring the addition of an excess amount of scavenger to bind subsequently formed acetaldehyde. As the amount of acetaldehyde scavenger added in the melt phase manufacture increases, so do costs and the degree of yellow hue imparted to the polymer by the scavenger, especially if the class of scavengers containing amine groups is used. Moreover, the effectiveness of the scavenger may also be impaired by undergoing two heat histories where the polyester is molten, especially when one of the heat histories is under high vacuum, high temperature, and high viscosity conditions (as in the melt phase polycondensation) where the thermal stability of some types of scavenger can be compromised and there can be losses due to scavenger volatility. With some scavengers, the amount of yellow color imparted by the scavenger may increase as the number of melt heat histories increases. It would be desirable, therefore, to produce solid high IV polyester polymer particles which do not contain acetaldehyde scavengers added in the melt phase yet have both a low AA generation rate and low residual acetaldehyde levels when fed to a subsequent melt processing zone.

U.S. Pat. No. 5,898,058 recommends using any one of a large number of conventional polycondensation catalysts (with combinations of Sb catalysts and one of Co, Zn, Mg, Mn or Ca based catalysts exemplified and/or claimed) in which the catalysts are deactivated late. This patent notes that the traditional antimony polycondensation catalyst will begin to catalyze or encourage the degradation of the polymer, leading to the formation of acetaldehyde and yellowing of the polymer. Once the polycondensation reaction essentially reaches completion, further reaction allows the catalyst to degrade the polymer and form acetaldehyde and a yellow hue. The patent discloses the manufacture of polyester precursors at an It.V. of about 0.64 and 0.62 dL/g, or 0.60 dL/g which was increased to an It.V. of 0.81 dL/g by solid state polymerization. The patent notes that solid state polymerization techniques are useful to increase the It.V. of the polyester to these higher levels.

It is known that the production of high I.V. polyester polymers in the melt phase is problematic because at high temperature, degradation reactions lead to the formation of acetaldehyde and acetaldehyde precursor formation, and it becomes more difficult to remove AA from the melt as the melt viscosity increases. Consequently, the molecular weight build-up in the melt has in the past been limited to a reasonably low number (e.g. It.V. of about 0.63 or less), followed by further advancing the molecular weight of the polymer in the solid state.

However, it would be desirable to obtain the desired high IV entirely in the melt phase with the elimination of the solid state polymerization step so as to avoid the significant equipment and conversion costs associated with this step. Moreover, high I.V. solid particles produced in the melt phase should have an acceptable AA generation rate for the application without the presence of a substance which binds AA during melt processing to form articles. Preferably, the solids fed to a subsequent melt processing zone should have an acceptable residual acetaldehyde content for the application without the need for adding an excess of an acetaldehyde scavenger to the melt phase production process.

3. SUMMARY OF THE INVENTION

There is now provided a simple robust process for making a high IV polyester polymer without the addition of AA scavengers to the melt phase while providing a particle suitable as a feed to a subsequent melt processing zone for making preforms having an acceptable acetaldehyde generation rate for the application and preferably containing acceptable residual acetaldehyde for the application. There is now provided a method for the production of solid polyester polymers comprising adding a stabilizer and/or an Sb catalyst deactivator to a polymer melt having an It.V. of at least 0.68 dL/g, preferably a phosphorus containing compound; and subsequently solidifying the melt into solid polyester polymer particles or molded articles which do not contain organic acetaldehyde scavengers.

There is also provided a method for the production of solid polyester polymer particles comprising:

a) polycondensing a molten polyester polymer composition in the presence of a polycondensation catalyst composition comprising antimony species;

b) continuing the polycondensation of the molten polyester polymer composition to an It.V. of 0.68 dL/g or more; and c) after reaching an It.V. of 0.68 dL/g or more, preferably 0.70 dL/g or more, and more preferably 0.72 dL/g or more, adding a stabilizer and/or an Sb catalyst deactivator to the polymer melt, preferably a phosphorus containing compound; and d) after reaching an It.V. of 0.68 dL/g or more, solidifying the melt into solid polyester polymer particles which do not contain organic acetaldehyde scavengers.

Compared to the particles where the addition of the deactivator/stabilizer in step c) is omitted, the particles produced by this process preferably have a reduction in AA generation rate of at least 10% or more, preferably at least 20% or more, more preferably at least 30% or more, and most preferably of at least 40% or more when made to It.V.'s of at least 0.68 dL/g. The reduction in AA generation rate is calculated by subtracting the AA generation rate of the particles with step c) from the rate of the particles with the stabilizer/deactivator addition omitted altogether and all else being equal, dividing that difference by the rate with step c) omitted, and multiplying by 100.

Preferably there is also provided an additional process step after solidification of the polyester from the melt phase polycondensation process in which:

e) the amount of residual acetaldehyde in the solid particles is reduced to a level of 10 ppm or less in the solid state without increasing the It.V. of the particles by more than 0.03 dL/g.

There is also provided a method for the manufacture of articles comprising:

(i) introducing solid polyester polymer particles, having:
  an It.V. of at least 0.68 dL/g obtained in melt phase polymerization,
  a degree of crystallinity of at least 20%,
  a residual acetaldehyde level of 10 ppm or less,
  residues of a polycondensation catalyst composition comprising antimony species,
  a reduction in acetaldehyde generation rate of at least 20% or at least 30% or more, or the AA generation rate measured at 295° C. for 5 minutes is less than 18 ppm, and
  lacking organic acetaldehyde scavengers, into a melt processing zone and melting the particles to form a molten polyester polymer composition; and (ii) forming an article comprising a sheet, strand, fiber, or a molded part from the molten polymer composition.

When the injection molding temperature is 285° C. and the melt residence time is 108 seconds, performs made from the particles of this process contain less than or equal to 9 ppm of free AA. Alternatively, preforms made from the particles of this process have a reduction in perform AA of at least 10% or more, preferably at least 20% or more, more preferably at least 30% or more, and most preferably of at least 40% or more. The reduction in perform AA is calculated by subtracting the perform AA of the perform made from particles with step c) from the perform AA of the perform made from particles with no addition of Sb stabilizers and/or deactivators and all else being equal, dividing that difference by the perform AA with step c) omitted, and multiplying by 100.

The invention has the advantage of making high IV polymers in the melt phase while avoiding the addition of excess acetaldehyde scavengers to the melt phase which are expensive and contribute to the formation of color bodies. Instead of controlling the formation of acetaldehyde in the melt-phase manufacture by adding an excess of acetaldehyde scavenger or reducing the It.V. to a low level, polyester polymer solids are produced in the melt-phase manufacture to have a low acetaldehyde generation rate while the residual AA formed in the melt phase manufacture is preferably reduced in the solid particles without resorting to solid-state polymerizing the polymer. The preferred process provides solid particles having a high IV obtained in melt phase manufacture without acetaldehyde scavengers and which are suitable as a feed to a subsequent melt processing zone for making preforms or other articles.

In preferred embodiments, other achievable advantages employ a robust and simple process which allows one the flexibility of avoiding solid state polymerization so that high levels of phosphorus can be added to promote stabilization and/or catalyst deactivation without concern as to the impact on solid-state polymerization rate and also allows the use of antimony-containing catalysts which can produce polymer compositions suitable to make articles having good brightness (high L* color) and acceptable yellowness (low b* color).

4. DETAILED DESCRIPTION OF THE INVENTION

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," "article," "container," or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence. Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. The viscosity of the polymer solutions is determined using a Viscotek Modified Differential Viscometer. A description of the operating principle of the differential viscometers can be found in ASTM D 5225. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where
$\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int}=\lim(\eta_{sp}/C)=\lim(\ln\eta_r)/C$$

$$C\to 0 \quad C\to 0$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted Ih.V. of Reference Material/Average of Triplicate Determinations The uncorrected inherent viscosity ($\eta_{inh}$) of each sample is calculated from the Viscotek Model Y501 Relative Viscometer using the following equation:

$$\eta_{inh}=[\ln(P_2/KP_1)]/C$$

where
P$_2$=The pressure in capillary P$_2$
P$_1$=The pressure in capillary P$_1$
ln=Natural logarithm
K=Viscosity constant obtained from baseline reading
C=Concentration of polymer in grams per 100 mL of solvent The corrected Ih.V., based on calibration with standard reference materials, is calculated as follows:

Corrected Ih.V.=Calculated Ih.V.×Calibration Factor

The intrinsic viscosity (It.V. or $\eta_{int}$) may be estimated using the Billmeyer equation as follows:

$$\eta_{int}=0.5[e^{0.5 \times Corrected\ Ih.V.}-1]+(0.75\times Corrected\ Ih.V.)$$

The reference for estimating intrinsic viscosity (Billmeyer relationship) is *J. Polymer Sci.*, 4, pp. 83-86 (1949).

The L* or b* color can be measured from specimens ground to a powder or made from a disc or from a preform or from a bottle sidewall as explained below. A specimen is considered to be within a specified L* or b* color range in the appended claims if the reported L* or b* value obtained from a specimen measured by any one of these test methods is within the ranges expressed in the appended claims. For example, a b* color value outside a specified b* range as measured by one test method but inside a specified b* range as measured by another test method is deemed to be a polymer within the specified range because it satisfied the specified b* color range by one of the test methods.

The measurements of L* and b* color values are conducted on specimens prepared according to any one of the following methods. Alternatively, color values are measured on polyester polymers ground to a powder passing a 3 mm screen.

For powdered samples, color measurements were performed in reflectance (specular included) using a HunterLab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer is standardized regularly and UV control was employed and maintained in calibration following the HunterLab recommendations. An optional glass port plate is installed at the reflectance port to minimize contamination of the sphere. Powders are placed in an optical glass cell. The optical-grade glass is recessed from the front of the cell by 0.062" and the glass itself is 0.092" thick. The sample area is 0.71" deep, 1.92" wide, 2.35" tall. The powders are allowed to settle by vibrating the sample for 20 seconds using a laboratory Mini-Vortexer (VWR International, West Chester, Pa.). The glass cell is maintained flush against the reflectance port and covered with a black opaque cover. A single cell packing is evaluated and the cell is removed and replaced for three replicate measurements for each sample. The reported value should be the average of the triplicates.

The invention relates to a method for the production of solid polyester polymer particles comprising:
  a) polycondensing a molten polyester polymer composition in the presence of a polycondensation catalyst composition comprising antimony species;
  b) continuing the polycondensation of the molten polyester polymer composition to an It.V. of 0.68 dL/g or more; and
  c) after reaching an It.V. of 0.68 dL/g or more, adding an Sb catalyst stabilizer and/or deactivator to the polymer melt, preferably a phosphorus containing compound; and
  d) after reaching an It.V. of 0.68 dL/g or more, solidifying the melt into solid polyester polymer particles which do not contain organic acetaldehyde scavengers and optionally but preferably
  e) the level of residual acetaldehyde in the solid particles is reduced down to a level of 10 ppm or less in the solid state without increasing the It.V. of the particles by more than 0.03 dL/g.

The "polyester polymer" of this invention is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container. The polyester polymer desirably contains alkylene terephthalate or alkylene naphthalate repeat units in the polymer chain. More preferred are polyester polymers which comprise:
  (i) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
  (ii) a hydroxyl component comprising at least 80 mole % of the residues of ethylene glycol or propane diol,
based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said polyester product(s) add up to 100. The "residues" of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In a preferred embodiment, the polyester polymer comprises:
(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 90 mole %, or at least 92 mole %, or at least 96 mole % of the residues of ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

Modifiers can be present in amount of up to 40 mole %, or up to 20 mole %, or up to 10 mole %, or up to 8 mole %, or up to 4 mole %, based on the total moles of their respective component in the polymer. Mono, tri and higher functional modifiers are preferably present in amounts of only up to about 8 mole %, or up to 4 mole %.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. As modifiers, the polyester polymer may preferably contain such comonomers as isophthalic acid, naphthalane dicarboxylic acid, 1,4-cyclohexanedimethanol, and diethylene glycol.

The polyester pellet compositions may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst composition comprising antimony species; or ester exchange usually in the presence of a transesterification catalyst in the ester exchange zone, followed by prepolymerization and finishing in the presence of a polycondensation catalyst composition comprising antimony species.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., and at a super-atmospheric pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 285° C.

The esterification reaction is continued until a acid or ester group conversion of at least 70% is achieved, but more typically until a acid or ester group conversion of at least 85% is achieved to make the desired oligomeric mixture (or otherwise also known as the "monomer"). The reaction to make the oligomeric mixture is typically uncatalyzed in the direct esterification process and catalyzed in ester exchange processes. The antimony containing catalyst may optionally be added in the esterification zone along with raw materials. Typical ester exchange catalysts which may be used in an ester exchange reaction between dialkylterephthalate and a diol include titanium alkoxides and dibutyl tin dilaurate, zinc compounds, manganese compounds, each used singly or in combination with each other. Any other catalyst materials well known to those skilled in the art are suitable. In a most preferred embodiment, however, the ester exchange reaction proceeds in the absence of titanium compounds. Titanium based catalysts present during the polycondensation reaction negatively impact the b* by making the melt more yellow. While it is possible to deactivate the titanium based catalyst with a stabilizer after completing the ester exchange reaction and prior to commencing polycondensation, in a most preferred embodiment it is desirable to eliminate the potential for the negative influence of the titanium based catalyst on the b* color of the melt by conducting the direct esterification or ester exchange reactions in the absence of any added titanium containing compounds. Suitable alternative ester exchange catalysts include zinc compounds, manganese compounds, or mixtures thereof.

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of water as the condensation by-product not removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. Water is removed as the esterification reaction proceeds in order to drive the equilibrium toward the desired products. The esterification zone typically produces the monomer and oligomer species, if any, continuously in a series of one or more reactors. Alternately, the monomer and oligomer species in the oligomeric mixture could be produced in one or more batch reactors. It is understood, however, that in a process for making PEN, the reaction mixture will contain the monomeric species bis(2-hydroxyethyl)-2,6-naphthalate and its corresponding oligomers. At this stage, the It.V. is usually not measurable or is less than 0.1. The average degree of polymerization of the molten oligomeric mixture is typically less than 15, and often less than 7.0.

Once the oligomeric mixture is made to the desired percent conversion of the acid or ester groups, it is transported from the esterification zone or reactors to the polycondensation zone. The commencement of the polycondensation reaction is generally marked by either a higher actual operating temperature than the operating temperature in the esterification zone, or a marked reduction in pressure compared to the esterification zone, or both. In some cases, the polycondensation reaction is marked by higher actual operating temperatures and lower (usually sub-atmospheric) pressures than the actual operating temperature and pressure in the esterification zone. Typical polycondensation reactions occur at temperatures ranging from about 260° C. and 300° C., and at sub-atmospheric pressure of between about 350 mmHg to 0.2 mm Hg. The residence time of the reactants typically ranges from between about 2 to about 6 hours. In the polycondensation reaction, a significant amount of glycols are evolved by the condensation of the oligomeric ester species and during the course of molecular weight build up.

The polycondensation zone is typically comprised of a prepolymer zone and a finishing zone, although it is not necessary to have split zones within a polycondensation zone. Polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers in the oligomeric mixture are polymerized via polycondensation to form polyethylene terephthalate polyester (or PEN polyester) in the presence of an antimony-containing catalyst. The catalyst composition comprising Sb species may be added in the esterification or polycondensation zones, such as immediately prior to initiating polycondensation, during polycondensation, or to the esterification zone prior to initiating esterification or ester exchange or during or upon completion of the esterification or ester exchange reaction. If the antimony catalyst is not added in the esterification stage for the manufacture of the oligomeric mixture, it is after esterification and before or during polycondensation, and preferably between esterification and polycondensation or early in the polycondensation, such as to a prepolymerization step (the first stage of polycondensation) to catalyze the reaction between the monomers and between the low molecular weight oligomers and between each other to build molecular weight and split off the diol(s) as a by-product. If the antimony containing catalyst is added to the esterification zone, it is typically blended with the diol(s) and fed into an esterification reactor(s) and/or into a paste tank containing a paste of terephthalic acid and glycol that is fed into the first esterification reactor.

In another embodiment, the antimony containing catalyst may be added to the melt phase before the It.V. of the melt exceeds 0.30 dL/g. By adding the antimony containing catalyst before the It.V. of the melt exceeds 0.30 dL/g, inordinately long reaction times are avoided. Preferably, the antimony containing catalyst is added before the It.V. of the melt exceeds 0.2 dL/g.

The molten polyester polymer is polycondensed in the presence of a polycondensation catalyst composition comprising an antimony species. When referencing "antimony," or any other inorganic catalyst, the antimony or other inorganic catalyst atom is present in any oxidation state. When referencing "elemental antimony" or any other inorganic catalyst in its elemental state, the oxidation state is zero.

X-ray fluorescence (XRF) is the analytical technique used to report catalyst levels in polymers. By convention, the XRF technique is referred to as "elemental analysis." In actuality, the XRF test is unaffected by the oxidation state of an inorganic-containing species; therefore, it can not differentiate between different oxidation states. The stated amount of measured antimony reflects the total antimony content, regardless of its oxidation state in the polymer. Measured antimony levels in the polyester are reported as the amount of Sb atoms in ppm based on the weight of the polymer, and not in terms of levels of the antimony compounds added. The preferred amount of antimony catalyst added is that effective to provide an antimony level of between about at least 100, or at least 180, or at least 200 ppm based on the weight of the polyester. For practical purposes, not more than about 500 ppm of antimony by weight of the resulting polyester is needed. A preferred range of antimony is from 150 to less than 300 ppm based on the weight of the polyester, and a most preferred range of antimony is from 175 ppm to 275 ppm Sb.

Suitable antimony containing catalysts added to the melt phase are any antimony containing catalysts effective to catalyze the polycondensation reaction. These include, but are not limited to, antimony (III) and antimony (V) compounds recognized in the art and in particular, diol-soluble antimony (III) and antimony (V) compounds, with antimony (III) being most commonly used. Other suitable compounds include those antimony compounds that react with, but are not necessarily soluble in the diols prior to reaction, with examples of such compounds including antimony (III) oxide. Specific examples of suitable antimony catalysts include antimony (III) oxide and antimony (III) acetate, antimony (III) glycolates, antimony (III) ethylene glycoxide and mixtures thereof, with antimony (III) oxide being preferred.

Using an antimony based catalyst is advantageous because the finished articles made from antimony-catalyzed polymers are usually brighter (higher L* color) or less yellow (lower b* color) than polymers catalyzed by the more reactive titanium catalyst. Furthermore, the melt phase polycondensation reaction promoted by an antimony catalyst in accordance with the invention is capable of proceeding within a wide range of operating temperatures and catalyst concentrations, producing amorphous pellets which, when crystallized, maintain an acceptable b* color of the base polyester polymer below +5 (measured without added colorants or toners), and with the addition optional toners or colorants, obtain a b* value of no greater than 3.0, while maintaining an L* brightness of at least 70, or at least 76, or at least 79. Thus, the process of the invention is not restricted to low catalyst concentrations and low polycondensation temperatures as in the case of titanium catalysts to maintain an acceptable b* color.

In one embodiment, the crystallized polyester polymer obtained by the process of the invention has an L* of at least 70, or at least 73, or at least 76, or at least 79.

Other catalysts which may be optionally present along with antimony species include catalysts containing zinc, cobalt, manganese, tin, germanium, and other known metals. In a preferred embodiment, however, the polycondensation catalyst composition consists essentially of antimony species, meaning that the amount of other metal species in combination with antimony should not increase the b* of the solid polyester polymer particles by more than 0.5 CIELAB units under the reaction conditions used relative to a composition made in the absence of any metal other than Sb under the same reaction conditions. More preferably, since titanium is a highly active catalyst metal that leads to increased color and degradation in the polyester, the amount of active titanium present in the polycondensation melt should be less than 5 ppm, preferably less than 3 ppm, more preferably less than 1 ppm and most preferably no titanium catalyst is added to the polycondensation melt. The amount of titanium added in the esterification zone to promote ester exchange reactions are not counted in the 5 ppm limitation so long as adequate stabilizer is added prior to commencing polycondensation of the melt as determined by adding at least a 2:1 molar stoichiometric amount of elemental phosphorus in the stabilizer to elemental titanium in the catalyst. Calculations in terms of elemental phosphorus and titanium are not meant to imply the actual oxidation state of these inorganic species in the polymer. One of the advantages of the preferred process lies in the simplicity of manufacturing a polyester polymer by direct esterification at acceptable rates without the need for employing more than one catalyst. Accordingly, in a yet more preferred embodiment, the polycondensation takes place in the presence of a polycondensation catalyst composition consisting exclusively of antimony species, meaning that no other metal catalyst compounds, such as titanium, gallium, germanium, zinc, manganese, or magnesium, are added in the melt-phase manufacturing process to actively catalyze the polycondensation reaction in the melt. In yet a more preferred embodiment, no other metal compounds, including cobalt, are added. It is to be recognized, however, that one or more of metals such as cobalt or manganese will most likely be present at low levels in the melt because they come as impurities with the terephthalic acid composition made from a metal catalyzed liquid phase oxidation process, but in the most preferred embodiment, these metals are not added to the melt phase production process.

The prepolymer polycondensation stage generally employs a series of one or more vessels and is operated at a temperature of between about 230° C. and 305° C. for a period between about five minutes to four hours. During this stage, the It.V. of the monomers and oligomers are increased generally up to about no more than 0.45 dL/g. The diol byproduct is removed from the prepolymer melt generally using an applied vacuum ranging from 4 to 200 torr to drive the polycondensation of the melt. In this regard, the polymer melt is sometimes agitated to promote the escape of the diol from the polymer melt. As the polymer melt is fed into successive vessels, the molecular weight and thus the melt viscosity, which is related to the intrinsic viscosity, of the polymer melt increases. The pressure of each vessel is generally decreased to allow for a greater degree of polymerization in each successive vessel or in each successive zone within a vessel. To facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, argon, helium and nitrogen.

Once the desired It.V. in the prepolymerization zone is obtained, generally no greater than 0.45 dL/g, or not greater than 0.3 dL/g, or not greater than about 0.2 dL/g, the prepolymer is fed from the prepolymer zone to a finishing zone where the second stage of polycondensation is continued in one or more finishing vessels generally, but not necessarily, ramped up to higher temperatures than present in the prepolymerization zone, to a value within a range of from 250° C. to 310° C., more generally from 270 to 300° C., until the It.V. of the melt is increased to an It.V in the range of from about at least 0.68 dL/g, or at least 0.70 dL/g, or at least 0.72 dL/g, or at least 0.75 dL/g and up to about 1.2 dL/g.

In one embodiment, the temperature applied to the polymer melt or of the polymer melt in at least a portion of the polycondensation zone is greater than 280° and up to about 290° C. In another embodiment, the temperatures in the finishing zone are, contrary to conventional practice, lower than 280° C. in order to avoid rapid increases in the rate of AA precursor formation. The final vessel, generally known in the industry as the "high polymerizer," "finisher," or "polycondenser," is also usually operated at a pressure lower than used in the prepolymerization zone to further drive off the diol and/or other byproducts and increase the molecular weight of the polymer melt. The pressure in the finishing zone may be within the range of about 0.2 to 20 mm Hg, or 0.2 to 10 mm Hg, or 0.2 to 2 mm Hg. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically but not necessarily mechanically agitated to facilitate the removal of the diol and/or other byproducts In the process of the invention, the residence time of the polymer melt in finishing zone of polycondensation is sufficient to make a polymer having an It.V. of at least 0.68 dL/g. The reaction time of the melt from an It.V. of 0.40 dL/g through and up to an It.V. in the range of at least 0.68 dL/g to 0.80 dL/g is 150 minutes or less, or 100 minutes or less, or 80 minutes or less, or 50 minutes or less. Preferably, the pressure applied within this range is about 2 mm Hg or less, and about 0.05 mm Hg or more. It is to be understood that the process described above is illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. Nor is it necessary to split the polycondensation reaction into a prepolymer zone and a finishing zone because the polycondensation reaction can take place on a continuum of slight variations in operating conditions over time in one polycondensation reactor or in a multitude of reactors in series, either in a batch, semi-batch, or a continuous process.

In step c) of the process, a stabilizer or a catalyst deactivator is added to the polymer melt. By a catalyst deactivator is meant a compound effective to at least partially deactivate the Sb catalytic activity. A compound is effective to at least partially deactivate an antimony catalyst when by its addition at a given level, the rate of AA generation upon melting particles or the residual AA level in the perform is reduced relative to the no additive case and/or, solely for testing the functionality of a compound at a given level, a) when the rate of solid-stating is reduced relative to the no additive case, or b) when added earlier, the rate of melt-phase polycondensation is reduced relative to the no additive case. The stabilizer or catalyst deactivator is added late during manufacturing to the polymer melt in order to limit the activity of antimony during subsequent melt processing steps and which would otherwise catalyze the conversion of acetaldehyde precursors present in the polymer to acetaldehyde. Left untreated, the polymer would have a high acetaldehyde generation rate during extrusion or injection molding and would produce an unacceptable amount of acetaldehyde in the preforms and bottles made from the polymer. The stabilizer or deactivator can also help thermally stabilize the polymer melt near the end of melt phase polycondensation and during remelting, for example, melt processing into articles, without which more reactions would occur to cleave the polymer chains in the highly viscous melt.

The stabilizer/deactivator compound is added at any point in the melt phase process after the polymer obtains an It.V. of at least 0.68 dL/g in the most preferably embodiment. In the melt phase, it is preferably added at a point when the polymer melt has obtained within +/−0.05 dL/g of the final desired It.V. or the It.V. used for making a preform. This is typically at the conclusion of the polycondensation process in the finisher or after the finisher but prior to pelletization. After the stabilizer/deactivator compound is added, it is recognized that the melt may continue to polymerize and build up molecular weight to a small extent, but usually not by more than an additional 0.05 dL/g units. In any case, the full amount of the stabilizer/deactivator is preferably added to the polymer melt before the polymer melt is solidified.

In an ester exchange reaction, a catalyst deactivator can be added at the conclusion of the ester exchange reaction and before polycondensation in molar amounts sufficient to deactivate the ester exchange catalyst without significantly impairing the catalytic activity of the antimony-containing catalyst added after deactivating the ester exchange catalyst. However, the ester exchange catalyst does not have to deactivated prior to adding the antimony-containing catalyst if the ester exchange catalyst does not unduly impair the color or thermal stability of the resulting polyester polymer melt phase product. Titanium containing catalysts, however, are preferably deactivated as much as possible before the start of polycondensation, and additional amounts are preferably not thereafter added to the polycondensation zones at all. In the case of direct esterification, and in the absence of any titanium-containing compounds, stabilizers can be added after the desired It.V. is obtained.

The stabilizer/deactivator is preferably a phosphorus containing compound. The phosphorus compound is preferably added to the polymer melt upon reaching an It.V. of at least 0.68 dL/g. The phosphorus compounds contain one or more phosphorus atoms. Preferred are acidic phosphorus compounds. Acidic phosphorus compounds are defined as having at least one oxyphosphorus acid group, that is, at least one phosphorus atom double-bonded to one oxygen and single-bonded to at least one hydroxyl or OH group. Specific examples of stabilizers include acidic phosphorus compounds such as phosphoric acid (also known as orthophosphoric acid), pyrophosphoric acid, polyphosphoric acid, and each of their acidic salts and acidic esters and acidic derivatives, including acidic phosphate esters such as phosphate mono- and di-esters, such as mixtures of mono- and di-esters of phosphoric acid with ethylene glycol, diethylene glycol, triethylene glycol or 2-ethyl-1-hexanol or mixtures of each; or acidic phosphate esters of pyrophosphoric acid or polyphosphoric acid with ethylene glycol, diethylene glycol, triethylene glycol or 2-ethylhexanol, or mixtures of each; or mixtures thereof with or without phosphoric acid, pyrophosphoric acid or polyphosphoric acid. Specific examples of stabilizers that are not acidic phosphorus compounds include, oligomeric phosphate tri-esters, (tris)ethylene glycol phosphate, tri-esters of phosphoric acid with ethylene glycol, diethylene glycol, or mixtures of each.

Some types of phosphorus compounds should be avoided in large quantities, and preferably avoided altogether. These types of phosphorus compounds are those which reduce the antimony catalyst to elemental antimony, that is to the zero oxidation state. Examples of such phosphorus compounds include phosphorous acid (also known as phosphonic acid) and phosphites. While elemental Sb is useful to provide a level of reheat capacity to the polymer, greater amounts of elemental Sb than needed to reheat the polymer in the shape of a preform are not desirable. Increasing amounts of elemental antimony grays the polymer and reduces the brightness of the preforms and bottles made from the polymer. Since the amount of phosphorus compound added to stabilize/deactivate Sb is typically much more than the amount of phosphorus needed to provide the necessary measure of reheat, phosphorus compounds which reduce Sb to elemental Sb are desirably used, if at all, in mixture with other non-reducing phosphorus compounds and in stoichiometric amounts needed to provide the requisite level of reheat in the preform and no more.

Further, we have discovered that phosphate triesters are not as effective at stabilizing/deactivating antimony ("Sb") catalysts as an acidic phosphorus compound such as phosphoric acid.

In some cases, however, a phosphate triester is preferred over phosphoric acid. For example, large quantities of phosphoric acid may promote corrosion of hoppers, pumps, and reactor vessels if the equipment does not have the proper metallurgy, such as titanium or Hastalloy.

The quantity of phosphorus added late relative to the antimony atoms used in this process is not limited, but consideration is taken for the amount of antimony metal and other metals present in the melt. The ratio of phosphorus moles to antimony moles is desirably at least 0.15:1, or at least 0.3:1, or at least 0.5:1, or at least 0.7:1, or at least 1:1, and up to about 3.0:1, preferably up to 2.5:1, or up to 2:1, or up to 1.5:1, or up to 1.2:1. The low end of the range is defined by the more active additives, that is, acidic phosphorus compounds. When the phosphorus source is a phosphate triester, it may take a phosphorus to antimony mole ratio of at least 0.5:1 to see a significant benefit. The upper end of the range is defined by 85% phosphoric acid. With this additive, a balance must be struck between decreasing AA and decreasing It.V. From a practical standpoint, It.V. loss has a negative impact on production rate. In addition, at some point, the It.V. loss may start interfering with the AA benefit as a lower It.V. means more hydroxyethyl end groups that can react with certain AA precursors to form AA. As stated earlier, the It.V. loss from late addition of 85% phosphoric acid is greater than that from a neat phosphate triester. Therefore, the upper range for neat phosphate triesters may exceed that stated. It is also important that the phosphorus level imparted earlier in the process be kept as low as possible. At the point just prior to late addition of a phosphorus compound, it is preferred that the phosphorus to antimony mole ratio in the polymer be 0.17:1 or lower. This preference imparts the maximum AA benefit. A higher phosphorus to antimony mole ratio in the polymer at the point just prior to late addition of a phosphorus compound may still result in a lowering of AA; however, the rate of decrease in AA with increasing late phosphorus level will be slower and the maximum decrease in AA will be smaller. That being said, the ranges of phosphorus to antimony mole ratios stated above are formulated in the case where the phosphorus to antimony mole ratio in the polymer immediately prior to the late addition of a phosphorus compound was 0.17:1 or lower.

Once the desired It.V. is obtained with a minimum It.V. of 0.68 dL/g and a phosphorus compound has been added to the polymer melt to stabilize/deactivate the antimony catalyst, the molten polyester polymer in the melt phase reactors is discharged as a melt phase product and solidified without the addition of an acetaldehyde scavenger to the polymer melt. Avoiding the addition of acetaldehyde scavengers is desirable because acetaldehyde scavengers are costly and can be responsible for increasing the b* color of the polyester polymer or decreasing its L* color after toning out yellow, especially when the reaction product of AA and the scavenger is colored. If the AA scavenger has thermal stability or volatility issues, the effectiveness of a given amount of scavenger at lowering AA may suffer when the scavenger is added in the finisher in a polycondensation zone where high heat and high vacuum are applied.

An acetaldehyde scavenger is a compound or polymer which interacts by physical forces or by chemical reaction with acetaldehyde to bind acetaldehyde and prevent its release from the polyester polymer. Rather than preventing the formation of acetaldehyde precursors or the subsequent reactions of the precursors to form AA, the scavengers operate by binding to acetaldehyde.

Acetaldehyde scavengers are known to those of skill in the art. Examples include polyamides such as those disclosed in U.S. Pat. Nos. U.S. Pat. No. 5,266,413, U.S. Pat. No. 5,258,233 and U.S. Pat. No. 4,8837,115; polyesteramides such as those disclosed in U.S. application Ser. No. 595, 460, filed Feb. 5, 1996; nylon-6 and other aliphatic polyamides such as those disclosed in Japan Patent Application Sho 62-182065 (1987); ethylenediaminetetraacetic acid (U.S. Pat. No. 4,357,461), alkoxylated polyols (U.S. Pat. No. 5,250,333), bis(4-[bgr]-hydroxyethoxyphenyl) sulfone (U.S. Pat. No. 4,330,661), zeolite compounds (U.S. Pat. No. 5,104,965), 5-hydroxyisophthalic acid (U.S. Pat. No. 4,093,593), supercritical carbon dioxide (U.S. Pat. No. 5,049,647 and U.S. Pat. No. 4,764,323) and protonic acid catalysts (U.S. Pat. No. 4,447,595 and U.S. Pat. No. 4,424,337), and the most well known acetaldehyde scavengers are homo and copolyamides such as poly(caprolactam), poly(hexamethylene-adipamide), poly(m-xylylene-adipamide), and any other compound or polymer having an active methylene group.

The melt phase product is processed to a desired form, such as amorphous particles. The shape of the polyester polymer particles is not limited, and can include regular or irregular shaped discrete particles without limitation on their dimensions, including stars, spheres, spheroids, globoids, cylindrically shaped pellets, conventional pellets, pastilles, and any other shape, but particles are distinguished from a sheet, film, preforms, strands or fibers.

The number average weight (not to be confused with the number average molecular weight) of the particles is not particularly limited. Desirably, the particles have a number average weight of at least 0.10 g per 100 particles, more preferably greater than 1.0 g per 100 particles, and up to about 100 g per 100 particles.

The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove particulates over a designated size before being cut.

Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer is one which is crystallizable. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

A preferred solidification technique integrates the cutting with the crystallization by not allowing the heat energy imparted to the polymer in the melt phase manufacture to drop below the $T_g$ before the polymer is both cut and crystallized to at least 20% degree of crystallinity. In one integrated solidification technique, the molten polyester polymer is directed through a die, cut at the die plate under water at high temperature and greater than atmospheric pressure, swept away from the cutter by the hot water and through a series of pipes to provide residence time to thermally crystallize the particles in the hot liquid water at a temperature greater than the $T_g$ of the polymer and preferably at about 130 to 180° C., after which the water is. separated from the crystallized particles and the particles are dried. In another integrated solidification technique, the molten polyester polymer is cut underwater, the particles are immediately separated from the liquid water after cutting, the particles are dried, and while the particles are still hot and before the temperature of the particles drops below the $T_g$ of the polymer and desirably while the particle temperature is above 140° C., the particles are directed from the dryer onto a surface or vessel which allows the particles to form a moving bed with a bed height sufficient to allow the latent heat within the particles to crystallize the particles without the external application of a heating medium or pressurizing means. Such a surface or vessel is desirably an at least partially enclosed vibrating conveyor, such as is available from Brookman Kreyenborg GmbH.

The degree of crystallinity is optionally at least 30%, or at least 35%, or at least 40%. The melt phase products are preferably substantially free of titanium residues, and in a direct esterification process, are preferably prepared by adding to the melt phase a polycondensation catalyst consisting only of antimony containing compound(s). Thus, polyester polymers made in the melt phase having acceptable color can be isolated and provided to a converter without the need for increasing their molecular weight in the solid state. By making the high It.V. product in the melt phase, the solid stating step can be altogether avoided. Solid stating is commonly used for increasing the molecular weight (and the It.V) of the pellets in the solid state, usually by at least 0.05 It.V. units, and more typically from 0.1 to 0.5 It.V. units.

In addition, certain agents which colorize the polymer can be added to the melt. In one embodiment, a bluing toner is added to the melt in order to reduce the b* of the resulting polyester polymer melt phase product. Such bluing agents include blue inorganic and organic toners. In addition, red toners can also be used to adjust the a* color. Organic toners, e.g., blue and red organic toners, such as those toners described in U.S. Pat. Nos. 5,372,864 and 5,384,377, which are incorporated by reference in their entirety, can be used. The organic toners can be fed as a premix composition. The premix composition may be a neat blend of the red and blue compounds or the composition may be pre-dissolved or slurried in one of the polyester's raw materials, e.g., ethylene glycol.

Examples of reheat additives (a reheat additive is deemed a compound added to the melt in contrast to forming a reheat aid in situ) used in combination with reduced antimony formed in situ or as an alternative to reduced antimony formed in situ include activated carbon, carbon black, antimony metal, tin, copper, silver, gold, palladium, platinum, black iron oxide, and the like, as well as near infrared absorbing dyes, including, but not limited to those disclosed in U.S. Pat. No. 6,197,851 which is incorporated herein by reference.

The iron oxide, which is preferably black, is used in very finely divided form, e.g., from about 0.01 to about 200 µm, preferably from about 0.1 to about 10.0 µm, and most preferably from about 0.2 to about 5.0 µm. Suitable forms of black iron oxide include, but are not limited to magnetite and maghemite. Red iron oxide may also be used. Such oxides are described, for example, on pages 323-349 of Pigment Handbook, Vol. 1, copyright 1973, John Wiley & Sons, Inc.

Other components can be added to the composition of the present invention to enhance the performance properties of the polyester polymer. For example, crystallization aids, impact modifiers, surface lubricants, denesting agents, antioxidants, ultraviolet light absorbing agents, colorants, nucleating agents, acetaldehyde bonding compounds, other reheat rate enhancing aids, sticky bottle additives such as talc, and fillers and the like can be included.

The compositions of the present invention optionally may additionally contain one or more UV absorbing compounds. One example includes UV absorbing compounds which are covalently bound to the polyester molecule as either a comonomer, a side group, or an end group. Suitable UV absorbing compounds are thermally stable at polyester processing temperatures, absorb in the range of from about 320 nm to about 380 nm, and are difficult to extract or nonextractable from said polymer. The UV absorbing compounds preferably provide less than about 20%, more preferably less than about 10%, transmittance of UV light having a wavelength of 370 nm through a bottle wall 12 mils (305 microns) thick. Suitable chemically reactive UV absorbing compounds include substituted methine compounds of the formula

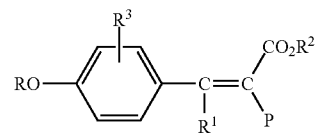

wherein:
  R is hydrogen, alkyl, substituted alkyl, aryl, substituted aryl, cycloalkyl, substituted cycloalkyl or alkenyl, or a polyoxyalkylene chain, such as polyoxyethylene or polyoxypropylene polymers, each optionally having some oxypropylene or oxyethylene units in the polymer chain as a block or random copolymer, the polyoxyalkylene chain having a number average molecular weight ranging from 500 to 10,000;
  $R^1$ is hydrogen, or a group such as alkyl, aryl, or cycloalkyl, all of which groups may be substituted;

$R^2$ is any radical which does not interfere with condensation with the polyester, such as hydrogen, alkyl, substituted alkyl, allyl, cycloalkyl or aryl;

$R^3$ is hydrogen or 1-3 substitutents selected from alkyl, substituted alkyl, alkoxy, substituted alkoxy and halogen, and P is cyano, or a group such as carbamyl, aryl, alkylsulfonyl, arylsulfonyl, heterocyclic, alkanoyl, or aroyl, all of which groups may be substituted.

Preferred methine compounds are those of the above formula wherein: $R^2$ is hydrogen, alkyl, aralkyl, cycloalkyl, cyanoalkyl, alkoxyalkyl, hydroxyalkyl or aryl; R is selected from hydrogen; cycloalkyl; cycloalkyl substituted with one or two of alkyl, alkoxy or halogen; phenyl; phenyl substituted with 1-3 substitutents selected from alkyl, alkoxy, halogen, alkanoylamino, or cyano; straight or branched lower alkenyl; straight or branched alkyl and such alkyl substituted with 1-3 substitutents selected from the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamoyl; vinyl-sulfonyl; acrylamido; sulfamyl; benzoylsulfonicimido; alkylsulfonamido; phenylsulfonamido; alkenylcarbonylamino; groups of the formula

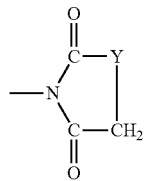

where Y is —NH—, —N-alkyl, —O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl; or groups of the formulae

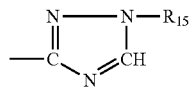

—NHXR$_{16}$, —CONR$_{15}$R$_{15}$, and —SO$_2$NR$_{15}$R$_{15}$;
wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—, and R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 substitutents selected from alkyl, alkoxy, or halogen substituents; and P is cyano, carbamyl, N-alkylcarbamyl, N-alkyl-N-arylcarbamyl, N,N-dialkylcarbamyl, N,N-alkylarylcarbamyl, N-arylcarbamyl, N-cyclohexyl-carbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1-10 carbons, preferably 1-6 carbons, straight or branched chain.

Preferred UV absorbing compounds include those where R and $R^1$ are hydrogen, $R^3$ is hydrogen or alkoxy, $R^2$ is alkyl or a substituted alkyl, and P is cyano. In this embodiment, a preferred class of substituted alkyl is hydroxy substituted alkyl. A most preferred polyester composition comprises from about 10 to about 700 ppm of the reaction residue of the compound

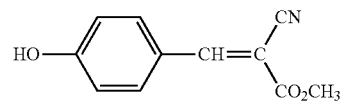

These compounds, their methods of manufacture and incorporation into polyesters are further disclosed in U.S. Pat. No. 4,617,374 the disclosure of which is incorporated herein by reference. The UV absorbing compound(s) may be present in amounts between about 1 to about 5,000 ppm by weight, preferably from about 2 ppm to about 1,500 ppm, and more preferably between about 10 and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The solid particles produced in the melt phase process preferably have an acetaldehyde generation rate, when measured at 295° C. for 5 minutes, of 20 ppm or less, or 18 ppm or less, or 16 ppm or less. The process of the invention does not require melting the particles at 295° C. for 5 minutes to make molded articles. The process conditions are not particularly limited. Compared to the particles that have been made with the addition of a stabilizer and deactivator in step c) omitted, the particles produced by this process preferably have a reduction in AA generation rate of at least 10% or more, preferably at least 20% or more, more preferably at least 30% or more, and most preferably of at least 40% or more. The reduction in AA generation rate is calculated by subtracting the AA generation rate of the particles with step c) from the rate of the particles with step c) omitted and all else being equal, dividing that difference by the rate with step c) omitted, and multiplying by 100.

In another embodiment, the level of AA in the 20 oz. preform is 11 ppm or less, or 9 ppm or less, or 7 ppm or less, as measured on a preform molded with a barrel temperature of 285° C. and a residence time of 108 seconds.

In yet another embodiment, the free AA on solid particles fed to a melt zone is
10 ppm or less, or 7 ppm or less, or 5 ppm or less, or 3 ppm or less.

The acetaldehyde generation rate can be measured on the solid particles and the free AA can be measured on solid particles or preforms. The following method is used to measure acetaldehyde generation on solid particles.

The method used to determine the level of free AA in the polyester polymer composition is the test method ASTM #F2013-00. This test method is used to measure the level of free acetaldehyde in particles, powders, preforms, bottles, and any other form the polyester polymer composition may take. For purposes of measuring residual or free acetaldehyde, the sample is tested according to the method described below. However, for purposes of measuring the acetaldehyde generation, the sample has to undergo a second melt history in order to determine the level of acetaldehyde generated. If the sample is a particle or powder which has not undergone a melt step in addition to a prior melt phase polycondensation step, the sample is first treated according to the Sample Preparation procedure described below, after which the sample is submitted to the ASTM #F2013-00 test method for analysis.

The test procedure for measuring the level of free acetaldehyde on a sample, whether a preform, pellet, powder, or other form is the ASTM #F2013-00 test method. Samples are cryogenically ground through a Wiley Mill equipped with a 1.0 mesh screen. The final ground material has a. particle size less than 800 μm. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated. The amount of acetaldehyde calculated represents the amount of free or residual acetaldehyde present in the sample.

To obtain the acetaldehyde generation rate, the ASTM #F2013-00 test method as described above is also used, except that prior to testing the sample by the ASTM #F2013-00 test method, it undergoes a melt history in addition to the previous melt phase polycondensation. For measuring the acetaldehyde generation rate on preforms, it is sufficient to use this ASTM #F2013-00 Method as described above without subjecting the preforms to a further melt history since by virtue of making a preform, the pellets are melted in an extruder prior to injection molding. By melt extruding or injection molding, AA precursors in the polymer melt have the opportunity to covert to acetaldehyde. In the event that the sample is a particle or a powder which has not seen a subsequent melt history, the sample is prepared according the Sample Preparation method, and then submitted to the ASTM #F2013-00 test. Sample Preparation: For the purpose of measuring the acetaldehyde generation rate, and if the sample has not seen a melt history subsequent to melt phase polycondensation, it is prepared according to this method prior to submitting the sample to the ASTM #F2013-00 test. Samples of polymer powder ground to pass a 3 mm screen are heated in an oven at 115° C. under vacuum (25-30 in. Hg) with a 4 SCFH nitrogen purge for at least 48 h. Although overnight drying would be sufficient for water removal alone, this extended oven treatment also serves to desorb to about 1 ppm or less the residual AA present in the high IV powder after melt-phase-only synthesis and prior to AA generation testing. It would take longer to desorb residual AA from pellets to about 1 ppm or less, due to the larger particle size (longer diffusion path). Any suitable acetaldehyde devolatization technique can be employed on pellets which reduces the level of free acetaldehyde down to about 1 ppm or less, including passing hot inert gas over the pellets for a time period sufficient to reduce the residual acetaldehyde to the desired level. The acetaldehyde devolatization temperature should not exceed 170° C. The sample is then packed in a preheated Tinius Olsen extrusion plastometer using a steel rod. The orifice die is calibrated according to ASTM D 1238. A small amount of material is purged out the bottom, which is then plugged. The piston rod assembly is put in the top of the barrel. A 225 g weight may be placed on top of the piston rod to hold the rod down inside of the barrel. The polymer is held at 295° C. for 5 min. The orifice plug is then removed from the bottom of the barrel. Via a large weight and operator pressure, the extrudate is pushed out of the barrel into an ice water bath. The extrudate is patted dry, sealed in a bag and placed in a freezer until the ASTM #F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample is collected, patted dry, sealed in a bag and placed in a freezer until the ASTM #F2013-00 test is performed.

Acetaldehyde can be generated in polyester resins with the Ceast Model 7027 Modular Melt Flow or any similar extrusion plastometer instrument. The automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but is not automated.

Acetaldehyde can be generated in the above manner over a temperature range of 265° C. to 305° C. The most consistent results are obtained between 285° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process making it ideal for testing laboratory samples.

In the invention, it is now possible to provide a feed of melt-phase-only synthesis polyester polymer particles to a subsequent melt processing step (e.g. extrusion/injection molding) having both low residual acetaldehyde and a low acetaldehyde generation rate. Advantageously, the melt phase production of the polyester particles no longer has to be controlled or restricted to the production of polyester polymer particles having a low level of residual acetaldehyde. Instead, a polyester polymer particle having a high level of residual acetaldehyde and a low acetaldehyde generation can now be obtained from the melt phase production of the polyester polymer. By this method, a robust melt-phase production process with wide processing windows is feasible in which the addition of an acetaldehyde scavenger is not necessary or desirable, which allows for the use of a conventional Sb catalyst composition, and permits the advancement of the polyester polymer to a. high It.V. By deactivating the Sb catalyst such that the conversion of acetaldehyde precursors does not occur during subsequent melt processing, and the post-melt-phase-polycondensation elimination of residual acetaldehyde, particles fit for making preforms can be provided to an injection molding machine.

Thus, in another embodiment, once particles are obtained from the melt phase production process, the residual acetaldehyde present in the particles is reduced by conventional means or by a preferred means as described below. The amount of residual acetaldehyde in the solid particles is reduced by techniques other that solid state polymerization processes which are expensive and result in significant molecular weight advancement. Desirably, the residual acetaldehyde in the solid particles are reduced in the solid state to a level of 10 ppm or less without increasing the It.V. of the particles by more than 0.03 dL/g. In this more preferred embodiment, the particles are not remelted and devolatized in order to reduce their level of acetaldehyde, nor are the particles subjected to solid state polymerization techniques which result in advancing the It.V. of the particles more than 0.03 dL/g. More preferably, the level of residual acetaldehyde in the solid particles is reduced to a level of 5 ppm or less. Most preferably, the level of residual acetaldehyde in the solid particles is reduced to a level of 2 ppm or less.

Any conventional technique for reducing the acetaldehyde in the particles is suitable other than solid state polymerization techniques and preferably other than by remelting/devolatization. For example, the vacuum procedure described previously as part of the sample preparation for the AA generation rate test; however, on a larger scale, a vessel would replace the oven.

Another technique to reduce the level of acetaldehyde in solid particles without advancing their molecular weight beyond 0.03 dL/g is referred to herein as acetaldehyde stripping. By this method, the residual acetaldehyde of the particles is reduced by introducing the particles into a vessel to form a bed of particles within the vessel, and contacting the bed with a stream of gas introduced at a gas flow rate not exceeding 0.15 SCFM per pound of particles per hour, and withdrawing finished particles from the vessel having a reduced amount of residual acetaldehyde.

In a gas stripping operation, a gas such as air or an inert gas such as nitrogen is contacted with the polyester polymer particles either co-current or countercurrent, preferably countercurrent to the flow of the particles in a vessel in a continuous or batchwise process, preferably a continuous process. The temperature of the gas introduced into the AA stripping vessel is not particularly limited, and can range from ambient to 180° C., but preferably from ambient to 70° C., or up to about 50° C., or up to about 40° C., and more preferably about ambient. The temperature of the gas exiting the stripping vessel will approximate the temperature of the pellets introduced into the vessel. Thus, if particles are introduced at 100° C., the exit temperature of the gas will be about 100° C.+/−20° C. The temperature of the gas exiting the vessel should not exceed a temperature at which the molecular weight of the particles is advanced in the solid state by more than 0.03 dL/g. The residence time of the particles depends on the gas temperature and particle mass/gas ratio, but in general, the residence time ranges from 1 hour to 30 hours The gas composition is not particularly limited, and includes nitrogen, carbon dioxide, or ambient air. The gas does not need to be dried, since the function of the gas is not to dry the pellets but to strip residual AA from the pellets. If desired, however, the gas may be dried.

While gas stripping of acetaldehyde may also occur in the dryer feeding the extruder for making an article, it is preferred to feed the dryer with polymer particles already having 10 ppm or less of residual acetaldehyde in order to reduce the gas flow used in the dryer and/or improve the quality of the articles made from the extruder. Moreover, in an AA stripping process, dry gas is not required to strip the AA from the particles, whereas in a drying process, a stream of dried air is circulated through the particles primarily to reduce the moisture on or in the particles with the secondary advantage of also removing AA. Thus, in an AA stripping process, ambient air can be and preferably is used as the stripping medium.

Thus, in one embodiment, the particles of the invention having an It.V. of at least 0.68 dL/g and a degree of crystallinity within a range of 20% to 55% and having a residual acetaldehyde level of 10 ppm or more are fed to a vessel, preferably through the upper end of a vessel, as hot particles (e.g. 100° C. to 180° C.) to increase the efficiency of AA stripping and form a bed of pellets flowing by gravity toward the bottom end of the vessel while a countercurrent flow of gas such as ambient air is circulated through the bed, said gas introduced into the vessel at a temperature ranging from ambient conditions to 70° C., or from ambient to 40° C., to thereby reduce the level of residual AA on the particles introduced into the vessel. The particles are withdrawn from the vessel within about 5 to 30 hours of their introduction into the countercurrent stream of gas. While the vessel can be pressurized, it is preferably not pressurized except by the pressure created from the gas flow. The vessel is desirably operated at about 0-5 psig, or ambient pressure.

The level of residual acetaldehyde present on the stripped particles is 10 ppm or less, or 7 ppm or less, or 5 ppm or less, or 3 ppm or less, or 2 ppm or less, or 1.5 ppm or less. The level of residual acetaldehyde present on the particles fed obtained from the melt phase polycondensation is generally 10 ppm or more, or 20 ppm or more, or 25 ppm or more, or 30 ppm or more. In another embodiment, the difference in the residual acetaldehyde levels of the pellets entering the stripping vessel and those exiting the vessel is at least 5 ppm, or at least 10 ppm, or at least 20 ppm, or at least 30 ppm.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to lower the level of acetaldehyde in the particles exiting the vessel as compared to those fed to the vessel. Preferably, the gas introduction point is to the lower half of the bed height in the vessel, and more preferably to the lower ¼ of the bed height. The gas flows through at least a portion of the particle bed, preferably through at least 50 volume % of the bed, more preferably through at least 75% of the particle bed volume. Any gas is suitable for use in the invention, such as air, carbon dioxide, and nitrogen. Some gases are more preferred than others due to the ready availability and low cost. For example, the use of air rather than nitrogen would lead to significant operating cost improvements. It was believed that the use of nitrogen gas was required in operations which pass a hot flow of gas through a bed of particles at temperatures above 180° C., such as in a preheater or solid-stater, because nitrogen is inert to the oxidative reactions, resulting in pellet discoloration, which would otherwise occur between many polyester polymers and the oxygen in ambient air. However, by keeping the process temperature low such that the gas exiting the vessel does not exceed 190° C., particle discoloration is minimized. In one embodiment, the gas contains less than 90 vol % nitrogen, or less than 85 vol % nitrogen, or less than 80 vol % nitrogen. In another embodiment, the gas contains oxygen in an amount of 17.5 vol % or more. The use of air at ambient composition (the composition of the air at the plant site on which the vessel is located), or air which is not separated or purified, is preferred. Desirably, ambient air is fed through the gas inlet. While the air can be dried if desired, it is not necessary to dry the air since the object is to remove acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel is preferably insulated to retain heat. The gas inlet and the finished particle outlet are desirably located below the gas outlet and the particle inlet, preferably with the gas outlet and particle inlet being toward the top of the vessel and the gas inlet and finished particle outlet being toward the bottom of the vessel. The gas is desirably introduced into the bed within the vessel at about ½ or more desirably at about the lower ¼ of the bed height within the vessel. The particles are preferably introduced at the top of the vessel, and move by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the vessel containing the particles within the stripping zone. The vessel preferably has an aspect ratio L/D of at least 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle outlet as the particles are fed to the vessel.

A suitable gas flow rate introduced into the vessel and passing through at least a portion of the particle bed is one which is sufficient to lower the amount of residual acetaldehyde on the particles exiting the vessel as compared to those introduced into the vessel. For example, for every one (1) pound of particles charged to the vessel per hour, suitable gas flow rates introduced into the vessel are at least 0.0001 standard cubic feet per minute (SCFM), or at least 0.001 SCFM, or at least 0.005 SCFM. High flow rates are also suitable, but not necessary, and the gas flow rate should be kept sufficiently low to avoid unnecessary energy consumption by the gas pumps, fans, or blowers. Moreover, it is not desired to unduly cool the particles or dry the particles because the achievement of either or both of these objectives typically requires the use of high gas flow rates. The gas flow rate is preferably not any higher than 0.15 SCFM, or not higher than 0.10 SCFM, or not higher than 0.05 SCFM, or even not higher than 0.01 SCFM for every one (1) pound of charged particles per hour.

Optimal process conditions to minimize oxidation reactions, discoloration, maintain the It.V. of the particles, and remove acetaldehyde while keeping the production costs low are to introduce the gas at ambient temperature, to feed particles within a range of 150° C. to 170° C. into a vertical cylindrical vessel at an air flow rate ranging from 0.002 SCFM to 0.009 SCFM per 1 lb/hr of PET. The size of the vessel is such that the residence time of the pellets averages about 10 to 24 hours.

The particles of the invention are directly or indirectly packaged as a bulk into shipping containers, which are then shipped to customers or distributors. It is preferred to subject the crystallized particles to any process embodiment described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least 3 cubic meters. In preferred embodiments, the bulk in the shipping container occupies a volume of at least 5 cubic meters, or at least 10 cubic meters.

In one embodiment, there is provided finished polyester polymer particles comprising:
an It.V. of at least 0.68, or 0.70, or 72 dL/g obtained in a melt phase polymerization production,
a degree of crystallinity of at least 20%, preferably at least 30%
a residual acetaldehyde level of 10 ppm or less,
antimony atoms,
phosphorus atoms,
an acetaldehyde generation rate less than 20 ppm, or 18 ppm or less, or 16 ppm or less, or a reduction in acetaldehyde generation rate or preform AA of at least 20% or at least 30% or more, relative to the composition without the addition of an Sb stabilizer and deactivator,
lacking organic acetaldehyde scavengers, and
which have not been solid state polymerized.

These particles preferably have a b* of 3 or less and an L* of 70 or more, or 73 or more, or 76 or more, or 79 or more.

By "finished" particles is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

If desired, an acetaldehyde scavenger in the form of a solid may be combined as a solid/solid blend with the polyester particles obtained from the melt phase. The acetaldehyde scavenger solids can be combined with the polyester polymer pellets prior to their introduction to a subsequent melt processing zone. Alternatively, the acetaldehyde scavenger solids can be separately fed to a melt processing zone for making the article along with a separate feed of the polyester particles. The acetaldehyde scavenger solids may be in the form of neat scavengers or in the form of a concentrate of acetaldehyde scavenger in a polyester solid, wherein the concentration of the acetaldehyde scavenger in the concentrate ranges from about 0.5 wt. % to 50 wt. %.

The articles can be formed from the melt phase products by any conventional techniques known to those of skill. For example, melt phase products, optionally solid state polymerized, which are crystallized to a degree of crystallization of at least 20%, are fed to a machine for melt extruding and injection molding the melt into shapes such as preforms suitable for stretch blow molding into beverage or food containers, or rather than injection molding, merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized pellet of the invention. Examples of trays are those which are dual ovenable and other CPET trays.

In another embodiment of the invention, there is provided a process for making articles comprising:
(i) introducing solid polyester polymer particles, having:
    an It.V. of at least 0.68 dL/g obtained in melt phase polymerization,
    a degree of crystallinity of at least 20%,
    a residual acetaldehyde level of 10 ppm or less,
    residues of a polycondensation catalyst composition comprising antimony species,
    an acetaldehyde generation rate at 295° C. for 5 min. of less than 20 ppm or 18 ppm or less, or 16 ppm or less,
    or a reduction in acetaldehyde generation rate or perform AA of at least 20% or at least 30%, relative to the composition without the addition of an Sb stabilizer and deactivator,
    and lacking organic acetaldehyde scavengers,
into a melt processing zone and melting the particles to form a molten polyester polymer composition; and
(ii) forming an article comprising a sheet, strand, fiber, or a molded part from the molten polymer composition.

In this embodiment, Sb catalyzed polyester polymer particles produced in the melt phase are made to a high It.V. and are provided as a suitable feed to the melt processing zone by having both low residual acetaldehyde and a low acetaldehyde generation rate without the presence of acetaldehyde scavengers in the particles fed to the melt processing zone. In this case, the acetaldehyde generation is measured on the particle feed, using the Sample Preparation technique described above to impart a melt history to the particles. In this embodiment, the residual acetaldehyde can be lowered to less than 10 ppm acetaldehyde by gas stripping the particles produced from the melt phase production process. Further, the catalyst stabilizer/deactivator added in the melt phase inhibits the Sb catalyst residues in the polymer from converting acetaldehyde precursors to acetaldehyde. In this embodiment, the particles fed to the melt processing zone are preferably not solid-state polymerized. The polyester particles made by melt-phase-only synthesis have a small surface to center molecular weight gradient and undergo less It.V. loss during melt processing than conventional polyesters. For example, bottles and/or preforms, and in particular beverage bottles such as carbonated soft drink or water bottles are made from the particles of the invention and the It.V. difference between the It.V. of the particles and the It.V of the preforms and/or bottles is not more than 0.04 dL/g, preferably not more than 0.03 dL/g, and most preferably not more than 0.02 dL/g.

In another embodiment, the molded article preferably lacks an organic acetaldehyde scavenger. Preferably, ingredients added to the solid polyester particles at the melt processing step do not include organic acetaldehyde scavengers.

In another embodiment, there is provided a process for making articles comprising:
(i) introducing solid polyester polymer particles, having:
    an It.V. of at least 0.68 dL/g obtained in melt phase polymerization,
    a degree of crystallinity of at least 20%,
    a residual acetaldehyde level of 10 ppm or less, residues of a polycondensation catalyst composition comprising antimony species, and
    lacking acetaldehyde scavengers,
into a melt processing zone and melting the particles to form a molten polyester polymer composition; and
(ii) forming an article comprising a sheet, strand, fiber, or a molded part from the molten polymer composition, wherein the article, such as a perform or bottle, has less than or equal to about 10 ppm of acetaldehyde, or 8 ppm or less acetaldehyde.

The amount of AA on the molded article can be measured by ASTM F2013-00, using an injection molding temperature setting of 285° C. and the melt residence time of about 108 seconds. Alternatively, preforms made from the particles of this invention have a reduction in perform AA of at least 20% or at least 30% or more, relative to preforms made from the composition without the addition of an Sb stabilizer and deactivator.

In this embodiment, the level of residual acetaldehyde is measured on the article, such as on a preform. In this case, a heat history need not be imparted to the preform sample since the particles were remelted in the injection molding machine. The amount of residual acetaldehyde present in the particles after drying but prior to injection molding should be subtracted from the residual acetaldehyde value obtained in the perform.

At the melt processing extruder, other components can be added to the extruder to enhance the performance properties of the pellets. These components may be added neat to the bulk polyester pellets or in a liquid carrier or can be added to the bulk polyester pellets as a solid polyester concentrate containing at least about 0.5 wt. % of the component in the polyester polymer let down into the bulk polyester. The types of suitable components include crystallization aids, impact modifiers, surface lubricants, denesting agents, compounds, antioxidants, ultraviolet light absorbing agents, colorants, nucleating agents, reheat rate enhancing aids, sticky bottle additives such as talc, and fillers and the like can be included. All of these additives and many others and their use are well known in the art and do not require extensive discussion.

In yet another embodiment, since the amorphous particles produced in the melt phase polymerization process are preferably crystallized but not solid state polymerized, the phosphorus compound may optionally also be added to polyester polymer particles by either melt compounding the phosphorus compounds with the polyester polymer particles to form a solid concentrate of polyester polymer particles containing randomly dispersed phosphorus compounds, after which the concentrate is fed to the melt processing zone for making an article along with a feed stream of polyester particles; or a stream of phosphorus compounds can be added directly to the melt processing zone to make the articles as a neat stream or in a slurry or dispersion, together with a stream of the polyester polymer particles.

The bottle preforms made from the polyester polymer obtained by the process of the invention will have an L* of at least 50, or at least 60, or at least 65, or at least 70. Further, the bottle preforms made from the polyester polymer obtained by the process of the invention will have a b* value of no greater than 3.0, while maintaining an L* brightness of at least 50, or at least 60, or at least 65, or at least 70.

Although Sb-catalyzed polyesters that are solid-stated have lower AA generation rates than those built up virtually exclusively in the melt phase, there is still room for improvement in AA generation rate of the solid-stated pellets, especially for applications like water bottles. In another embodiment, solid-stated pellets are melt blended with an acidic phosphorus compound in an extruder or static mixer or some other mixing device. The AA generation rate of the solid-stated polymer treated with the acidic phosphorus compound is lower than the same solid-stated resin put through the same mixing process but with no additive.

The mixing device where the acidic phosphorus compound is introduced may be part of the injection molding process, or it may be a separate step prior to injection molding. The acidic phosphorus compound may be introduced neat, in a liquid carrier or via a polymer concentrate. Introduction neat or in a liquid carrier is more preferred since reaction with the catalyst in the polymer carrier may lower effectiveness. If acidic phosphorus compound is a liquid and is added neat, a mixer at ambient conditions could be used to coat the pellets with the liquid additive prior to entry into an extruder. If the polymer concentrate route is used, the concentrate pellets could be dry blended at ambient conditions with the solid-stated pellets to make a 'salt and pepper' type blend. These same comments and approaches apply to melt blending an acidic phosphorus compound with pellets made exclusively in the melt-phase.

The quantity of phosphorus added late relative to the antimony atoms used in this process is not limited, but consideration is taken for the amount of antimony metal and other metals present in the melt. The ratio of phosphorus moles to antimony moles is desirably at least 0.15:1, or at least 0.3:1, or at least 0.5:1, or at least 0.7:1, or at least 1:1, and up to about 3.0:1, preferably up to 2.5:1, or up to 2:1, or up to 1.5:1, or up to 1.2:1

Reaction between acidic phosphorus compounds and Sb catalyst are fast per Example 8. The AA generation results are similar for a melt residence time of about 1 minute and that of about 3.3 minutes. Since the time is short in a melt-blending process, acidic phosphorus compounds are preferred over phosphate triesters, which react more slowly.

Examples 5, 6 & 8 illustrate the lower AA generation rate and lower residual AA of this embodiment. The solid-stated polyester used in these examples worked well because the phosphorus level in the pellets was low prior to melt blending. At the point just prior to late addition of a phosphorus compound, it is preferred that the phosphorus to antimony mole ratio in the polymer be 0.17:1 or lower. In fact, it is not required that the solid-stated pellets contain any phosphorus prior to mixing with the acidic phosphorus compound. This preference for a P:Sb mole ratio of 0.17 or lower imparts the maximum AA benefit. A higher phosphorus to antimony mole ratio in the polymer at the point just prior to late addition of a phosphorus compound may still result in a lowering of AA; however, the rate of decrease in AA with increasing late phosphorus level will be slower and the maximum decrease in AA will be smaller. These comments on low P levels in pellets also apply to blends with polyester pellets made exclusively in the melt-phase.

In addition to lowering AA generation rate, melt-blending of phosphorus lowers the solid-stating rate. Slower solid-stating rates support the mechanism of partial catalyst deactivation. The extent of the decrease in solid-stating rate will depend on the P:Sb mole ratio, where the decrease in rate will be larger as mole ratio increase. The sample without H3PO4 took about 1.6 hours to reach 0.76 IhV while the sample with 90 ppm P from H3PO4 took about 8 hours to reach 0.76 IhV.

This invention can be further illustrated by the additional examples of embodiments thereof, although it will be understood that these examples are included merely for purposes of illustration and are not intended to limit the scope of the invention.

EXAMPLES

Most of the high IV polyesters in the examples of the invention were made exclusively in the melt phase, i.e., the molecular weight of the polyester melt-phase products as indicated by their IhV or ItV were not increased in the solid state. Exceptions are the examples involving addition of the stabilizing/deactivating compound during the melt processing step such as Examples 5, 6, & 8, in which commercial PET that had been solid-stated was used to feed the melt processing step.

A commercial polyester sold to make carbonated soft drink bottles as CB-12 available from Eastman Chemical Company is submitted every time the AA generation test is done on experimental samples. The AA level in preforms made from CB-12, a polymer made under typical processing conditions and solid-state polymerized, is considered acceptable. The AA generation results on this commercial polyester are considered as a benchmark: AA generation rates less than or equal to the AA generation value of the commercial CB-12 pellets indicate an acceptable level of preform AA for carbonated soft drink applications at the time the testing is done Comparative Example 1

The starting oligomeric mixture employed in the polycondensations was prepared from terephthalic acid, ethylene glycol, about 1.4 mole percent of about 35% cis/65% trans 1,4-cyclohexanedimethanol, and about 2.7 mole percent of diethylene glycol generated during esterification. The conversion of acid groups was about 93.5% by titration methods alone and 92.9 to 95.9% by NMR/titration carboxyl ends groups methods. The $M_n$ of the oligomeric mixture was about 843 g/mole, and the $M_w$ was about 1928 g/mole.

For polycondensation, the ground oligomer (103 g) is weighed into a half-liter, single-necked, round-bottomed flask. The catalyst solution added to the flask is antimony triacetate in ethylene glycol. A 316 L stainless steel paddle stirrer and glass polymer head were attached to the flask. After attaching the polymer head to a side arm and a purge hose, two nitrogen purges are completed.

The polymerization reactor is operated under control of a CAMILE™ automation system, programmed to implement the following array.

| Stage | Time (min.) | Temp. C.° | Vacuum (torr) | Stir Speed (rpm) |
|---|---|---|---|---|
| 1 | 0.1 | 285 | 730 | 0 |
| 2 | 10 | 285 | 730 | 150* |
| 3 | 2 | 285 | 140* | 300* |
| 4 | 1 | 285 | 140 | 300 |
| 5 | 10 | 285 | 51* | 300 |
| 6 | 5 | 285 | 51 | 300 |
| 7 | 1 | 285 | 4.5* | 300 |
| 8 | 20 | 285 | 4.5 | 300 |
| 9 | 2 | 285 | 0.8* | 30* |
| 10 | 500# | 285 | 0.8 | 30 |

*= ramp;

= torque termination

A molten bath of Belmont metal is raised to surround the flask, and the CAMILE™ array is implemented. In this array, a "ramp" is defined as a linear change of vacuum, temperature, or stir speed during the specified stage time. The stirring system is automatically calibrated between stages 4 and 5. The finisher stage (10) is terminated according to the stirrer torque. The average reaction time is about 58 min.; therefore, this will be the finisher time used in the following example. The polymer is cooled for about 15 min., separated from the glass flask, cooled for about 10 min. and placed immediately into liquid nitrogen. The polymers are ground cryogenically to pass a 3 mm screen. The residual or free AA sample is kept frozen.

Table 1 sets forth the analytical results. The measurement techniques for determining free AA, AA generation, L* and b* were as described as above. L* and b* were measured on the powder.

TABLE 1

| Sample # | Finisher Time (min) | XRF Sb (ppm) | XRF P (ppm) | IhV (dL/g) | ItV (dL/g) | L* Color | b* Color | AA Free (ppm) | AA Gen 295/5 (ppm) |
|---|---|---|---|---|---|---|---|---|---|
| 56 | 60.67 | 239 | 2 | 0.761 | 0.802 | 78.81 | 4.37 | 22.79 | 26.42 |
| 58 | 54.78 | 242 | 2 | 0.762 | 0.803 | 80.43 | 4.52 | 22.48 | 25.96 |
| CB-12 | . | . | . | . | . | . | . | 1.06 | 20.08 |

In the Table 1 runs, no phosphorus compound was added. From the results in Table 1, it can be seen that Sb-catalyzed, high IV melt-phase PET polyesters have higher free AA and a higher AA generation rate than the commercial, solid-stated PET (CB-12).

Example 2

In this example, the phosphorus stabilizer is added during the melt phase manufacturing step. The oligomers described in Example 1 were used in this example. Phosphorus thermal stabilizers are added to polyester polymers. When terminating a polymer run at a torque equivalent to approximately 0.80 IhV, the reaction time was about 58 min, per Example 1. After the 58 minutes of polymerization time, the vacuum was broken, the phosphorus compound was added, and vacuum was resumed to enhance mixing.

In this example, the phosphorus compound is either phosphoric acid or an oligomeric phosphate triester (OPT). To minimize the potential loss in ItV, a concentrated form of the phosphorus compound was used. By using a concentrated form of the phosphorus compound, the amount of solvent present which could hydrolyze or glycolyze the polymer is reduced. Phosphoric acid was added as an 85 weight % solution in water. Oligomeric phosphate tri-esters were added directly as a 9 wt./wt. % phosphorus solution.

The following array sets forth the processing conditions for runs with late addition of a phosphorus compound. The phosphorus compounds were added at stage 12. For each phosphorus target, two polymer runs were made per the following array, one for the addition of phosphoric acid, and one for the addition of oligomeric phosphate triesters.

| Stage | Time Minutes | Temperature C.° | Vacuum torr | Stir Speed rpm |
|---|---|---|---|---|
| 1 | 0.1 | 285 | 730 | 0 |
| 2 | 10 | 285 | 730 | 150* |
| 3 | 2 | 285 | 140* | 300* |
| 4 | 1 | 285 | 140 | 300 |
| 5 | 10 | 285 | 51* | 300 |
| 6 | 5 | 285 | 51 | 300 |
| 7 | 1 | 285 | 4.5* | 300 |
| 8 | 20 | 285 | 4.5 | 300 |
| 9 | 2 | 285 | 0.8* | 30* |
| 10 | 58 | 285 | 0.8 | 30 |
| 11 | 3 | 285 | 650* | 30 |
| 12 | 2 | 285 | 650 | 30 |
| 13 | 1 | 285 | 0.5* | 45* |
| 14 | 5 | 285 | 0.5 | 45 |

*= ramp

Table 2 sets forth the analytical results.

TABLE 2

| Smp # | Additive | XRF Sb ppm | XRF P ppm | P:Sb Mole Ratio | IhV | ItV | L* Color | b* Color | Free AA (ppm) | % Reduction in Free AA** | AA Gen 295/5 (ppm) | % Reduction in AA Gen** |
|---|---|---|---|---|---|---|---|---|---|---|---|---|
| CB-12 | | | | | | | | | 1.06 | | 20.08 | |
| 70 | None | 243 | 2 | 0 | 0.84 | 0.891 | 76.44 | 4.6 | 22.08 | 3.5 | 25.3 | 1.2 |
| 71 | None | 243 | 1 | 0 | 0.83 | 0.88 | 79.7 | 4.44 | 24.74 | −8.2 | 25.76 | −0.6 |
| 64 | n.d.* | 244 | 3 | 0 | 0.833 | 0.883 | 79.09 | 5.41 | 21.79 | 4.7 | 25.73 | −0.5 |
| 61 | H$_3$PO$_4$ | 247 | 93 | 1.5 | 0.808 | 0.855 | 77.39 | 4.28 | 14.97 | 34.5 | 15.1 | 41.0 |
| 66 | H$_3$PO$_4$ | 243 | 129 | 2.1 | 0.751 | 0.791 | 78.83 | 3.94 | 10.59 | 53.7 | 17 | 33.6 |
| 67 | OPT | 246 | 34 | 0.5 | 0.843 | 0.894 | 78.79 | 3.9 | 21.46 | 6.2 | 24.88 | 2.8 |
| 65 | OPT | 246 | 67 | 1.1 | 0.814 | 0.862 | 80.26 | 4.08 | 20.09 | 12.2 | 16.47 | 35.7 |
| 63 | OPT | 246 | 109 | 1.7 | 0.799 | 0.845 | 80.35 | 4.42 | 17.89 | 21.8 | 22.1 | 13.7 |

*n.d. = none detected: this row has phosphoric acid (H$_3$PO$_4$) added late at the lowest target (40 ppm P) and, according to XRF testing, does not contain the phosphorus expected: therefore, the flask walls or stirrer rod may have received the very small amount of H$_3$PO$_4$, or the very small amount was just too difficult to measure and/or deliver.
**When there is more than one run without P, the AA values for the runs without P are averaged prior to use in this calculation. A negative reduction indicates an increase in AA.

As can be seen from Table 2, both phosphoric acid (H$_3$PO$_4$) and the oligomeric phosphate triester (OPT) lower free AA and AA generation rates. At high phosphorus levels, phosphoric acid was more effective at reducing the AA generation rate than OPT. Retaining the flexibility of lowering the AA generation rate at higher phosphorus levels is desirable to ensure that the catalyst is sufficiently stabilized/deactivated. The phosphorus level chosen is a balance between the % reduction needed in AA generation rate and the It.V. loss incurred Comparative Example 3

The starting oligomeric mixture employed in the polymerizations or polycondensations was prepared from terephthalic acid, ethylene glycol, about 1.2 mole percent of about 35% cis/65% trans 1,4-cyclohexanedimethanol, and about 2.8 mole percent of diethylene glycol generated during esterification. The conversion of acid groups was about 94.5% by titration methods alone and 94.6% by NMR/titration carboxyl ends groups methods.

The procedure and Camile array described in Example 1 were used here as well. Table 3 sets forth the analytical results.

TABLE 3

| Sample # | Finisher Time (min) (min) | XRF Sb (ppm) | XRF P (ppm) | IhV (dL/g) | ItV (dL/g) | L* Color CIELAB | b* Color CIELAB |
|---|---|---|---|---|---|---|---|
| 1 | 77 | 235 | 1 | 0.788 | 0.832 | 79.7 | 3.41 |
| 2 | 84 | 238 | 1 | 0.807 | 0.854 | 78.78 | 2.88 |
| 6 | 67 | 240 | 2 | 0.783 | 0.827 | 81.58 | 4.13 |
| 8 | 92 | 233 | 1 | 0.821 | 0.87 | 78.35 | 4.97 |

The average reaction time is about 80 min.; therefore, this will be the finisher time used in the following example.

Example 4

In this example, the phosphorus stabilizer is added during the melt phase manufacturing step. The oligomers described in Example 3 were used here as well. Phosphorus thermal stabilizers are added to polyester polymers. When terminating a polymer run at a torque equivalent to approximately a 0.80 IhV, the reaction time was about 80 min, per Example 3. After the 80 minutes of polymerization time, the vacuum was broken, the phosphorus compound was added, and vacuum was resumed to enhance mixing. The procedure and array described in Example 2 were used here except for the stage 10 time. Table 4 sets forth the analytical results.

TABLE 4

| Sample # | Additive | XRF Sb (ppm) | XRF P (ppm) | P:Sb Mole Ratio | IhV (dL/g) | ItV (dL/g) | L* Color | b* Color | Free AA (ppm) | % Reduction in Free AA | AA Gen 295/5 (ppm) | % Reduction in AA Gen |
|---|---|---|---|---|---|---|---|---|---|---|---|---|
| CB-12 | | | | | | | | | 0.7 | | 20.73 | |
| 10 | None | 243 | 1 | 0.0 | 0.855 | 0.908 | 78.22 | 3.96 | 29.55 | −2.9 | 28.65 | −8.0 |
| 28 | None | 239 | 2 | 0.0 | 0.835 | 0.885 | 76.94 | 3.52 | 29.02 | −1.0 | 23.78 | 10.3 |
| 46 | None | 237 | 2 | 0.0 | 0.839 | 0.89 | 77.14 | 2.83 | 27.6 | 3.9 | 27.13 | −2.3 |
| 34 | H3PO4 | 236 | 65 | 1.1 | 0.779 | 0.822 | 76.03 | 2.93 | 16.89 | 41.2 | 19.39 | 26.9 |
| 20 | H3PO4 | 239 | 85 | 1.4 | 0.844 | 0.896 | 74.74 | 3.52 | 20.42 | 28.9 | 15.45 | 41.7 |
| 42 | H3PO4 | 241 | 95 | 1.5 | 0.805 | 0.852 | 77.86 | 2.59 | 14.37 | 50.0 | 17.03 | 35.8 |
| 30 | H3PO4 | 243 | 103 | 1.7 | 0.784 | 0.828 | 75.85 | 5.25 | 15.27 | 46.8 | 16.85 | 36.5 |
| 24 | H3PO4 | 232 | 133 | 2.3 | 0.769 | 0.811 | 77.53 | 3.68 | 14.48 | 49.6 | 17 | 35.9 |
| 38 | H3PO4 | 236 | 146 | 2.4 | 0.8 | 0.846 | 79.92 | 5.93 | 14.38 | 49.9 | 14.04 | 47.6 |
| 22 | OPT | 234 | 21 | 0.4 | 0.826 | 0.875 | 77.39 | 3.04 | 17.17 | 40.2 | 22.32 | 15.8 |
| 40 | OPT | 225 | 61 | 1.1 | 0.808 | 0.855 | 79.1 | 3.01 | 21.61 | 24.8 | 21.18 | 20.1 |
| 26 | OPT | 238 | 65 | 1.1 | 0.812 | 0.859 | 77.81 | 2.85 | 21.49 | 25.2 | 22.68 | 14.5 |
| 44 | OPT | 237 | 93 | 1.5 | 0.796 | 0.841 | 78.12 | 2.91 | 17.94 | 37.5 | 14.99 | 43.5 |

TABLE 4-continued

| Sample # | Additive | XRF Sb (ppm) | XRF P (ppm) | P:Sb Mole Ratio | IhV (dL/g) | ItV (dL/g) | L* Color | b* Color | Free AA (ppm) | % Reduction in Free AA | AA Gen 295/5 (ppm) | % Reduction in AA Gen |
|---|---|---|---|---|---|---|---|---|---|---|---|---|
| 36 | OPT | 238 | 96 | 1.6 | 0.821 | 0.87 | 79.12 | 2.59 | 21.54 | 25.0 | 22.18 | 16.4 |
| 32 | OPT | 241 | 130 | 2.1 | 0.799 | 0.845 | 77.26 | 4.35 | 14.65 | 49.0 | 19.34 | 27.1 |

The additional data in Table 4 confirm the preliminary data of Table 2. As can be seen from Table 4, both phosphoric acid ($H_3PO_4$) and the oligomeric phosphate triester (OPT) lower free AA and AA generation rates. At high and low phosphorus levels, phosphoric acid was more effective at reducing the AA generation rate than OPT. Retaining the flexibility of lowering the AA generation rate at high phosphorus levels is desirable to ensure that the catalyst is sufficiently stabilized/deactivated. The phosphorus level chosen is a balance between the % reduction needed in AA generation rate and the It.V. loss incurred.

The free AA of sample 20 was lowered. Five grams of the sample were placed in a 115° C. oven under full vacuum (about 29 in. Hg) for about 48.5 hours. The sample was placed in a desiccator to cool for 30 min. and then was frozen until tested.

| Sample # | Additive | Treatment | Free AA (ppm) |
|---|---|---|---|
| CB-12 | | None | 0.74 |
| 20 | H3PO4 | None | 7.18 |
| 20 | H3PO4 | Oven | 0.97 |

Time had passed after sample #20 was made, ground and stored at ambient conditions; therefore, the free AA in the untreated sample was lower than the original measurement due to normal attrition of a volatile compound. The oven treatment lowered the free AA in Sample #20 to about 1 ppm.

Example 5

In this example, the phosphorus stabilizer is added during the melt processing step (melting a solid polyester polymer). A commercial PET was modified with 1.5 mole percent of about 35% cis/65% trans 1,4-cyclohexanedimethanol, and about 2.8 mole percent of diethylene glycol. It contained about 250 ppm Sb and about 8 ppm P. The PET was dried overnight at 120° C. in an air dryer with desiccant beds. As before, the phosphorus compound is either phosphoric acid or an oligomeric phosphate triester (OPT). 4500 grams of PET pellets were mixed with the liquid phosphorus compound in a Henschel mixer for about 30 seconds. The pellets coated with the phosphorus compound were then fed to a single screw extruder with a barrel temperature of 275° C. and a screw speed of 20 rpm, which was calculated to give a melt residence time of about 3.3 minutes. The extruded strands were passed through a water bath and pelletized. Free AA samples were stored immediately on dry ice and then transported to a freezer. CB-12 control was not extruded.

Table 5 sets forth the analytical results.

TABLE 5

| Sample # | Additive | Mixed & Extruded | IhV (dL/g) | ItV (dL/g) | XRF Sb (ppm) | XRF P (ppm) | L* Color | b* Color | Free AA (ppm) | AA Gen 295/5 (ppm) |
|---|---|---|---|---|---|---|---|---|---|---|
| 147-4 | none | No | 0.75 | 0.79 | 248 | 8 | 83.62 | −1.76 | 0.32 | 16.195 |
| 147-1 | none | Yes | 0.676 | 0.708 | 250 | 8 | 61.49 | 0.81 | 12.18 | 21 |
| 147-2 | OPT | Yes | 0.645 | 0.674 | 246 | 97 | 59.22 | 0.41 | 14.34 | 17.39 |
| 147-3 | $H_3PO_4$ | Yes | 0.647 | 0.676 | 243 | 107 | 59.20 | 0.09 | 11.72 | 10.8 |
| CB-12 | | | | | | | | | 0.75 | 17.57 |

In Table 5, the first control is the starting pellets, which have not been through the extruder. Per the results of Table 5, $H_3PO_4$ is much more effective at lowering both types of AA than OPT, especially at short residence times.

Example 6

Melt blending a preformed polymer with an additive in a glass flask achieves a uniform distribution of additive within the polymer like an extruder would-only with less shear and more time. The same commercial polymer described in Example 5 is used in this example. The pellets are ground to pass a 2 mm screen, and 100 grams of the polyester powder are weighed into a 500 mL round bottom flask. The powder is dried at 120° C. under full vacuum (25-30 in. Hg) overnight (about 16 hours) in a vacuum oven. After cooling the flask to room temperature in a desiccator, the catalyst-deactivating additive or stabilizer is weighed into the flask. The additive is phosphoric acid ($H_3PO_4$). A polymer head with stirrer is attached and the flask purged twice with nitrogen. A molten bath of Belmont metal is raised to surround the flask, and the following CAMILE™ array is implemented.

| Stage | Time Min. | Temp. °C. | Vac Torr | Stir RPM |
|---|---|---|---|---|
| 1 | .1 | 270 | 730 | 0 |
| 2 | 5 | 270 | 730 | 0 |
| 3 | 5 | 270 | 730 | 0 |
| 4 | 5 | 270 | 730 | 15* |
| 5 | 4 | 270 | 730 | 35* |
| 6 | 2 | 270 | 730 | 75* |
| 7 | 5 | 270 | 730 | 75 |

*= ramp

A moderate nitrogen purge was employed at all times. During Stages 2 & 3, the stirrer is turned slowly by hand. Following the end of the array, the polymer is cooled for about 15 min., separated from the glass flask, cooled for about 10 min. and placed immediately into liquid nitrogen. The polymers are ground cryogenically to pass a 3 mm screen. The residual or free AA sample is kept frozen. Table 6 sets forth the analytical results, which will be compared to Example 7.

TABLE 6

| Sample # | Additive | XRF Sb (ppm) | XRF P (ppm) | IhV (dL/g) | ItV (dL/g) | AA Free (ppm) | AA gen 295/5 (ppm) | L* Color | b* Color |
|---|---|---|---|---|---|---|---|---|---|
| 11 | none | 201 | 12 | 0.763 | 0.8 | 11.58 | 21.87 | 84.28 | 0.34 |
| 14 | $H_3PO_4$ | 199 | 92 | 0.729 | 0.76 | 7.85 | 13.01 | 84.17 | 0.07 |
| CB-12 | | | | | | 0.84 | 22.63 | | |

Example 7

The same oligomeric mixture as described in Example 1 was used here also. Runs were catalyzed by about 250 ppm Sb. Blue and red organic toners are added. The CAMILE array described in Example 2 is used in this example as well. Phosphoric acid is added in stage 12. Table 7 sets forth the analytical results.

TABLE 7

| Cat. | Red Toner (ppm) | Blue Toner (ppm) | XRF P (ppm) | ItV (dL/g) | Free AA (ppm) | AA Gen 295/5 (ppm) | L* Color | b* Color |
|---|---|---|---|---|---|---|---|---|
| Sb | 6.29 | 12.58 | 87 | 0.848 | 14.51 | 11.54 | 74.3 | −2.9 |
| CB-12 | | | | 0.84 | | 18.64 | | |

Example 8

The same polyester and procedure used in Example 5 is used here except for the drying conditions. First, the PET was dried overnight at 150° C., and then the dryers were turned down to 60° C. at 6 AM; however, the PET still had at least about 150 ppm water. The dryers were turned up to 150° C. for most of the working day, the water level was down to about 50 ppm, and the dryers were turned down to 60° C. overnight. Since the water level was about 170 ppm in the morning, the PET was moved to a different set of dryers and dried at 165° C. for about an hour and a half before turning the set-point down to 60° C.

Sample numbers ending with a B &/or C indicate that the single extrusion denoted by the number portion has multiple samples isolated. The sample without a letter is the first cut. The second cut is labeled "B." Second and third samples that were not differentiated were labeled "BC." The first number denotes the number assigned to the extrusion; after a slash, the second # indicates the number under which analytical testing was submitted. Free AA was only tested once per extrusion. The first row describes the sample taken from the drier immediately prior to extrusion (this sample was not extruded).

In this example, the time in the extruder is varied. The table is arranged with the fast screw speeds or shortest times first within an additive group. In addition to extrusions with an oligomeric phosphate triester coated pellets and phosphoric acid coated pellets, there are extrusions with polyphosphoric acid coated pellets and water coated pellets. The weight of water used was 15% of the weight of the 85% phosphoric acid used, i.e., the amount of water expected to be in the extrusions of pellets coated with 85% phosphoric acid.

TABLE 8

| Sample # | Additive | Screw Speed (rpm) | Approx_Time (min) | IhV (dL/g) | ItV (dL/g) | XRF Sb (ppm) | XRF P (ppm) | Old L* Color | Old b* Color | Free AA (ppm) | AA Gen 295/5 (ppm) |
|---|---|---|---|---|---|---|---|---|---|---|---|
| Dried | none | 0 | 0 | 0.761 | 0.802 | 248 | 8 | 81.14 | −1.98 | 0.24 | 18.61 |
| 2 | none | 80 | 1 | 0.711 | 0.747 | 250 | 8 | 57.9 | 1.22 | 5.49 | 22.54 |
| 17 | none | 80 | 1 | 0.692 | 0.726 | 240 | 8 | 56.44 | 0.44 | 3.1 | 21.77 |
| 3 | none | 35 | 2.1 | 0.681 | 0.714 | 251 | 9 | 60.03 | 1.46 | 9.35 | 24.07 |
| 18 | none | 35 | 2.1 | 0.689 | 0.722 | 240 | 8 | 59.96 | 0.86 | | 24.15 |
| 18B/21 | none | 35 | 2.1 | 0.663 | 0.694 | 237 | 8 | 58.93 | 0.66 | 5.74 | 21.39 |
| 1 | none | 20 | 3.3 | 0.672 | 0.704 | 250 | 11 | 61.02 | 2.22 | 22.58 | 29.5 |
| 16 | none | 20 | 3.3 | 0.681 | 0.714 | 236 | 8 | 60.19 | 1.11 | 12.04 | 29.06 |
| 4 | OPT | 80 | 1 | 0.627 | 0.654 | 247 | 158 | 58.28 | 1.54 | 10.36 | 22.3 |
| 5 | OPT | 35 | 2.1 | 0.622 | 0.649 | 249 | 167 | 60.1 | 1.09 | 14.42 | 22.89 |
| 6 | OPT | 20 | 3.3 | 0.624 | 0.651 | 235 | 159 | 61.06 | 1.11 | 21.67 | 24.49 |
| 9 | PPA | 80 | 1 | 0.665 | 0.696 | 240 | 132 | 52.83 | 2.46 | | 11.15 |
| 9B/19 | PPA | 80 | 1 | 0.634 | 0.662 | 240 | 132 | 53.35 | 2.29 | 10.15 | 13.71 |
| 7 | PPA | 35 | 2.1 | 0.672 | 0.704 | 237 | 125 | 57.24 | 1.14 | 11.48 | 12.65 |
| 8 | PPA | 20 | 3.3 | 0.666 | 0.697 | 238 | 130 | 58.32 | 1.66 | 15.52 | 12.38 |
| 11 | H3PO4 | 80 | 1 | 0.687 | 0.72 | 238 | 97 | 55.39 | 0.13 | 9.12 | 10.46 |
| 12 | H3PO4 | 35 | 2.1 | 0.648 | 0.677 | 238 | 99 | 58.75 | 0.64 | | 10.42 |
| 12BC1/23 | H3PO4 | 35 | 2.1 | 0.673 | 0.705 | 248 | 105 | 59.63 | 0.41 | 10.46 | 10.67 |
| 12BC2/24 | H3PO4 | 35 | 2.1 | 0.657 | 0.687 | 230 | 94 | 59.55 | 0.3 | 10.16 | 11.1 |
| 10 | H3PO4 | 20 | 3.3 | 0.634 | 0.662 | 234 | 97 | 59.83 | 0.79 | 13.37 | 11.43 |
| 13 | water | 80 | 1 | 0.722 | 0.759 | 233 | 11 | 57.97 | 0.72 | 2.87 | 18.47 |
| 14 | water | 35 | 2.1 | 0.706 | 0.741 | 240 | 9 | 59.21 | 1.11 | 6.21 | 22.73 |
| 15 | water | 20 | 3.3 | 0.672 | 0.704 | 240 | 8 | 60.16 | 1.31 | | 27.79 |
| 15B/20 | water | 20 | 3.3 | 0.685 | 0.718 | 227 | 8 | 61.3 | 1.16 | 11.85 | 25.13 |
| CB-12 1st | | 0 | 0 | 0.797 | 0.843 | | | | | 0.77 | 22.12 |
| CB-12 last | | 0 | 0 | 0.788 | 0.832 | | | | | 0.79 | 22.32 |

Per the controls with additive equal none, increasing the residence time in the extruder increases the IV loss, the free AA and the AA generation rate. The pellet size increases with decreasing time in the extruder. The brightness of the polymer increases as the residence time increases.

These extrusions indicate that the reaction between acidic phosphorus compounds and the antimony catalyst are fast. The AA generation results are about the same for a one minute extrusion and a 3.3 minute extrusion. Phosphoric acid is the best additive in terms of reducing AA generation rate and maintaining a bright and neutral color. While polyphosphoric acid reduces AA generation rate almost as well as phosphoric acid, polyphosphoric acid addition makes the PET darker and more yellow than phosphoric acid addition.

The oligomeric phosphate triester (OPT) reduces the AA generation rate somewhat at longer extrusion times; however, it is not as effective as acidic phosphorus compounds. There is more IV loss and more reduction in AA generation rate for 85% phosphoric acid than for the 15% water alone.

Example 9

The starting oligomeric mixture employed in the polycondensations was prepared from terephthalic acid, ethylene glycol, about 2.8 mole: percent of about 35% cis/65% trans 1,4-cyclohexanedimethanol, and about 2.8 mole percent of diethylene glycol generated during esterification. The conversion of acid groups was about 93.7% by NMR alone and 94.8% by NMR/titration carboxyl ends groups methods. The $M_n$ of the oligomeric mixture was about 768 g/mole, and the M, was about 1950 g/mole.

The array used is similar to that shown in Example 2 except the temperature in all the stages is 275° C. and stage 10 time is 121.2 minutes. The "TBP" in Table 9 stands for tributyl phosphate, and the target was 300 ppm. The "water" runs in Table 9 had the amount of water added that would be present in the charge of 85% phosphoric acid for a target of 300 ppm phosphorus.

TABLE 9

| Sample # | Additive | XRF Sb | XRF P | P:Sb Mole Ratio | IhV (dL/g) | ItV (dL/g) | L* | b* | Free AA (ppm) | % Reduction in Free AA | AA Gen 295/5 (ppm) | % Reduction in AA Gen |
|---|---|---|---|---|---|---|---|---|---|---|---|---|
| 070 | None | 261 | 3 | 0 | 0.777 | 0.82 | 84.69 | 3.67 | 13.23 | 1 | 20.38 | 5.5 |
| 093 | None | 265 | 2 | 0 | 0.756 | 0.797 | 82.33 | 2.29 | 13.95 | −4.4 | 20.765 | 3.7 |
| 117 | None | 244 | 4 | 0.1 | 0.77 | 0.812 | 82.42 | 2.19 | 14.345 | −7.3 | 22.265 | −3.2 |
| 122 | None | 258 | 3 | 0 | 0.767 | 0.809 | 82.13 | 2.8 | 11.94 | 10.7 | 22.85 | −6.0 |
| 113 | H3PO4 | 246 | 86 | 1.4 | 0.767 | 0.809 | 83.04 | 3.1 | 8.37 | 37.4 | 14.82 | 31.3 |
| 112 | H3PO4 | 255 | 199 | 3.1 | 0.743 | 0.708 | 81.3 | 2.57 | 7.765 | 41.9 | 18.135 | 15.9 |
| 116 | H3PO4 | 249 | 300 | 4.7 | 0.653 | 0.683 | 82.98 | 3.31 | 8.52 | 36.3 | 18.885 | 12.4 |
| 083 | OPT | 265 | 89 | 1.3 | 0.74 | 0.779 | 81.67 | 3.78 | 12.395 | 7.3 | 19.63 | 9.0 |
| 115 | OPT | 247 | 179 | 2.8 | 0.74 | 0.779 | 82.17 | 2.04 | 10.69 | 20 | 20.985 | 2.7 |
| 085 | OPT | 264 | 257 | 3.8 | 0.713 | 0.749 | 82.76 | 2.27 | 12.105 | 9.4 | 23.69 | −9.9 |
| 132 | OPT | 266 | 278 | 4.1 | 0.684 | 0.717 | 83.69 | 2.56 | 12.815 | 4.1 | 23.84 | −10.5 |
| 087 | TBP | 252 | 36 | 0.6 | 0.765 | 0.807 | 80.24 | 2.68 | 11.93 | 10.7 | 22.675 | −5.1 |

TABLE 9-continued

| Sample # | Additive | XRF Sb | XRF P | P:Sb Mole Ratio | IhV (dL/g) | ItV (dL/g) | L* | b* | Free AA (ppm) | % Reduction in Free AA | AA Gen 295/5 (ppm) | % Reduction in AA Gen |
|---|---|---|---|---|---|---|---|---|---|---|---|---|
| 118 | TBP | 260 | 15 | 0.2 | 0.781 | 0.825 | 82.54 | 3.28 | 13.65 | −2.1 | 21.36 | 1.0 |
| 091 | Water | 258 | 3 | 0.0 | 0.741 | 0.78 | 80.07 | 2.32 | 10.9 | 18.4 | 23.74 | −10.1 |
| 114 | Water | 265 | 3 | 0 | 0.759 | 0.8 | 81.05 | 2.04 | 13.31 | 0.4 | 20.745 | 3.8 |
| CB-12 | | | | | | | | | 0.79 | | 18.28 | |

Per Table 9, about 90 ppm phosphorus from phosphoric acid gives a lower AA generation rate than about 200 or 300 ppm phosphorus from phosphoric acid. There is more It.V. loss at higher levels of phosphoric acid. From Example 4, Sample #38, 150 ppm phosphorus from phosphoric acid does a good job lowering AA generation rate.

Example 10

Samples 11 & 17 prepared in Example 8 are solid-stated at 220° C. and 0.5 mm Hg. Prior to solid-stating, pellets are sieved to be −6/+8 mesh.

TABLE 10

| Starting Material | SS Time (hours) | Additive | IhV (dL/g) | ItV (dL/g) |
|---|---|---|---|---|
| 11 | 0 | 89 ppm P from H3PO4 | 0.69 | 0.723 |
| 11 | 1 | 89 ppm P from H3PO4 | 0.686 | 0.719 |
| 11 | 2 | 89 ppm P from H3PO4 | 0.696 | 0.73 |
| 11 | 3 | 89 ppm P from H3PO4 | 0.703 | 0.738 |
| 11 | 4 | 89 ppm P from H3PO4 | 0.714 | 0.75 |
| 11 | 6 | 89 ppm P from H3PO4 | 0.742 | 0.781 |
| 11 | 8 | 89 ppm P from H3PO4 | 0.76 | 0.801 |
| 11 | 10 | 89 ppm P from H3PO4 | 0.784 | 0.828 |
| 11 | 12 | 89 ppm P from H3PO4 | 0.797 | 0.843 |
| 17 | 0 | None | 0.712 | 0.748 |
| 17 | 1 | None | 0.736 | 0.774 |
| 17 | 2 | None | 0.771 | 0.813 |
| 17 | 3 | None | 0.788 | 0.832 |
| 17 | 4 | None | 0.837 | 0.888 |
| 17 | 6 | None | 0.867 | 0.922 |
| 17 | 8 | None | 0.897 | 0.956 |
| 17 | 10 | None | 0.981 | 1.052 |
| 17 | 12 | None | 1.014 | 1.091 |
| 11 | 0 | 89 ppm P from H3PO4 | 0.684 | 0.717 |
| 11 | 1 | 89 ppm P from H3PO4 | 0.684 | 0.717 |
| 11 | 2 | 89 ppm P from H3PO4 | 0.697 | 0.731 |
| 11 | 3 | 89 ppm P from H3PO4 | 0.707 | 0.742 |
| 11 | 4 | 89 ppm P from H3PO4 | 0.717 | 0.753 |
| 11 | 6 | 89 ppm P from H3PO4 | 0.744 | 0.783 |
| 11 | 8 | 89 ppm P from H3PO4 | 0.767 | 0.809 |
| 11 | 10 | 89 ppm P from H3PO4 | 0.773 | 0.816 |
| 11 | 12 | 89 ppm P from H3PO4 | 0.8 | 0.846 |
| 17 | 0 | None | 0.715 | 0.751 |
| 17 | 1 | None | 0.737 | 0.776 |
| 17 | 2 | None | 0.784 | 0.828 |
| 17 | 3 | None | 0.792 | 0.838 |
| 17 | 4 | None | 0.827 | 0.879 |
| 17 | 6 | None | 0.888 | 0.945 |
| 17 | 8 | None | 0.952 | 1.019 |
| 17 | 10 | None | 0.976 | 1.047 |
| 17 | 12 | None | 1.025 | 1.103 |

Solid-stating rate is decreased with the addition of an acidic phosphorus compound late. The extent of the decrease in solid-stating rate will depend on the P:Sb mole ratio. The sample without $H_3PO_4$ took about 1.6 hours to reach 0.76 IhV while the sample with 90 ppm P from $H_3PO_4$ took about 8 hours to reach 0.76 IhV.

Example 11

Melt blending was done per procedures and details discussed in Example 6, except the vacuum set points in stages 5, 6 & 7 are 0.5 mm Hg. The polymer used in Example 6 was used here and is identified by a catalyst system of 230 ppm Sb & 8 ppm P. In addition, another commercial solid-stated PET was used. It had the same target composition; however, its phosphorus level was higher per the identification by a catalyst system of 230 ppm Sb & 55 ppm P.

TABLE 11

| Sample | Catalyst System | Additive | XRF Sb (ppm) | XRF P (ppm) | IhV 1 (dL/g) | ItV (dL/g) | Free AA (ppm) | AAGEN 295/5 (ppm) |
|---|---|---|---|---|---|---|---|---|
| CB-12 | (ppm) | | . | . | . | . | 0.87 | 20.52 |
| 44 | 230 Sb & 8 P | none | 246 | 7 | 0.758 | 0.799 | 8.03 | 17.37 |
| 45 | 230 Sb & 8 P | H3PO4 | 245 | 55 | 0.747 | 0.787 | 5.48 | 11.98 |
| 46 | 230 Sb & 55 P | none | 226 | 55 | 0.735 | 0.773 | 9.28 | 20.19 |
| 47 | 230 Sb & 8 P | H3PO4 | 246 | 81 | 0.734 | 0.772 | 4.27 | 9.58 |
| 48 | 230 Sb & 55 P | H3PO4 | 229 | 120 | 0.729 | 0.767 | 7.99 | 18.48 |
| 49 | 230 Sb & 8 P | H3PO4 | 243 | 94 | 0.726 | 0.763 | 4.17 | 11.12 |
| 50 | 230 Sb & 55 P | none | 231 | 56 | 0.737 | 0.776 | 10.74 | 22.41 |
| 55 | 230 Sb & 55 P | H3PO4 | 231 | 138 | 0.717 | 0.753 | 6.37 | 15.94 |

TABLE 11-continued

| Sample | Catalyst System | Additive | XRF Sb (ppm) | XRF P (ppm) | IhV 1 (dL/g) | ItV (dL/g) | Free AA (ppm) | AAGEN 295/5 (ppm) |
|---|---|---|---|---|---|---|---|---|
| 52 | 230 Sb& 8 P | none | 243 | 7 | 0.761 | 0.802 | 9.01 | 17.23 |

In Table 11, to find the amount of phosphorus from the additive, the amount of phosphorus in polymer prior to phosphorus additive addition (see runs with no additive) is subtracted from number in the value XRF P (ppm). As it can be seen, when the starting polymer has less phosphorus, the late addition of a phosphorus compound is more effective at lowering AA generation rate.

What we claim is:

1. Finished polyester polymer particles obtained by a process comprising polycondensing a molten polyester polymer composition to an It.V. of at least 0.68dL/g; then adding at least one antimony catalyst stabilizer or deactivator comprising an acidic phosphorous compound to the polymer melt; and then solidifying the polymer melt into solid polyester polymer particles, and having:
   a degree of crystallinity of at least 20%,
   antimony atoms,
   phosphorus atoms,
   an acetaldehyde generation rate of less than 20 ppm, as measured at 295° C. for 5 minutes,
   lacking organic acetaldehyde scavengers, and
   which have not been solid state polymerized,
   wherein the molar ratio of phosphorus atoms to antimony atoms, P:Sb, is at least 1:1.

2. The finished particles of claim 1, wherein the particles have a residual acetaldehyde level of 10 ppm or less.

3. The finished particles of claim 1, wherein said finished particles comprise a bulk of particles.

4. The finished particles of claim 3, wherein the bulk is contained in a shipping container.

5. The finished particles of claim 4, wherein the bulk occupies a volume of at least 10 cubic meters.

6. The finished particles of claim 4, wherein the particles have an It.V. of at least 0.72 dL/g obtained in the melt phase and a degree of crystallinity of at least 30%.

7. The finished particles of claim 1, wherein the particles have a b* of 3 or less and an L* of 70 or more.

8. The finished particles of claim 1, wherein the L* is 76 or more.

9. The finished particles of claim 1, wherein the antimony atom content ranges from 150 ppm to 300 ppm.

10. The finished particles of claim 1, wherein the particles are devoid of active titanium species.

11. The finished particles of claim 1, wherein the It.V. of the particles made in a melt phase production is at least 0.70 dL/g.

12. The finished particles of claim 1, wherein the phosphorus atoms are obtained from an acidic phosphorus compound.

13. The finished particles of claim 12, wherein the phosphorus atoms are obtained from phosphoric acid.

14. The finished particles of claim 1, wherein the level of residual acetaldehyde is 7 ppm or less.

15. The finished particles of claim 1, wherein the molar ratio of phosphorus atoms to antimony atoms, P:Sb, is 1:1 to 2.1:1 and the phosphorus is present in the form of $H_3PO_4$.

16. The finished particles of claim 1, wherein the molar ratio of phosphorus atoms to antimony atoms, P:Sb, is 1.5:1 to 2.1:1 and the phosphorus is in the form of $H_3PO_4$.

17. The finished particles of claim 1, wherein the molar ratio of phosphorus atoms to antimony atoms, P:Sb, is from 1.4:1 to 4.7:1 and the phosphorus is present in the form of $H_3PO_4$.

18. The finished particles of claim 1, having an It.V that is within +/−0.05 dL/g of the molten polyester polymer composition.

* * * * *